United States Patent [19]

Itagaki et al.

[11] Patent Number: 5,384,341
[45] Date of Patent: Jan. 24, 1995

[54] ACTINIC-RADIATION-CURING HOT-MELT PRESSURE-SENSITIVE COMPOSITION

[75] Inventors: Makoto Itagaki, Fujisawa; Eiichi Kawasaki, Yokohama; Kazuya Shinkoda, Kanagawa; Kousuke Suewaka, Kamakura, all of Japan

[73] Assignee: Mitsui Toatsu Chemicals, Inc., Tokyo, Japan

[21] Appl. No.: 172,805

[22] Filed: Dec. 27, 1993

[30] Foreign Application Priority Data

Dec. 28, 1992 [JP] Japan .................................. 4-348204
May 28, 1993 [JP] Japan .................................. 5-126831
Nov. 4, 1993 [JP] Japan .................................. 5-275112

[51] Int. Cl.$^6$ .......................... C08F 2/48; C09J 31/04; C09J 133/10
[52] U.S. Cl. ..................................... 522/111; 522/112; 522/120; 522/149; 522/153; 522/182
[58] Field of Search ............... 522/112, 120, 149, 182, 522/111, 153

[56] References Cited

U.S. PATENT DOCUMENTS

| | | | |
|---|---|---|---|
| 3,842,059 | 10/1974 | Milkovich et al. | 260/93.5 A |
| 4,500,683 | 2/1985 | Hori et al. | 524/533 |
| 5,057,366 | 10/1991 | Husman et al. | 428/355 |
| 5,118,750 | 6/1992 | Silver et al. | 525/85 |
| 5,225,470 | 7/1993 | Mancinelli | 524/271 |

FOREIGN PATENT DOCUMENTS

| | | |
|---|---|---|
| 1614484 | 12/1981 | Japan . |
| 57-109873 | 7/1982 | Japan . |
| 2-276879 | 11/1990 | Japan . |
| 3-119082 | 5/1991 | Japan . |
| 3-139584 | 6/1991 | Japan . |
| 3-220275 | 9/1991 | Japan . |
| 4-31482 | 2/1992 | Japan . |

*Primary Examiner*—Susan W. Berman
*Attorney, Agent, or Firm*—Burns, Doane, Swecker & Mathis

[57] ABSTRACT

There is disclosed an actinic-radiation-curing, hot-melt pressure-sensitive adhesive composition, which comprises a mixture in a limited mixing ratio of an acrylic high-molecular-weight polymer that is made up of main chain having a molecular weight of 8,000 to 100,000 and a glass transition temperature of −75° to −20° C., and branched chain, in which the main chains and/or branched chains have or at least one ethylenically unsaturated group; and a low-molecular-weight polymer having a molecular weight of 500 to 8,000 and a glass transition temperature of lower than 100° C., which polymer has or does not have an ethylenically unsaturated group in the molecule.

18 Claims, No Drawings

ACTINIC-RADIATION-CURING HOT-MELT PRESSURE-SENSITIVE COMPOSITION

FIELD OF THE INVENTION

The present invention relates to an actinic-radiation-curing, hot-melt, pressure-sensitive adhesive composition comprising a high-molecular-weight polymer that has ethylenically unsaturated groups and a low-molecular-weight polymer that has or does not have ethylenically unsaturated groups.

More particularly, the present invention relates to an acrylic, actinic-radiation-curing, hot-melt, pressure-sensitive adhesive composition that is excellent in coating workability in hot-melt at a relatively low temperature (about 80° to 100° C.) before curing, and that is excellent in heat-resistant cohesive force resulting from the curing reaction by actinic radiation, typically ultraviolet rays or an electron beam.

BACKGROUND OF THE INVENTION

Since acrylic pressure-sensitive adhesives are excellent in weather resistance, deterioration resistance, and adhesiveness, they are used for various applications, for example, for pressure-sensitive adhesive labels, pressure-sensitive adhesive sheets, and pressure-sensitive adhesive tapes, and under present conditions they are mainly of the solvent type or the emulsion type.

On the other hand, as matters now stand, hot-melt pressure-sensitive adhesives are used in the form of a composition whose base polymer is a styrene/isoprene/styrene block copolymer, and such adhesives are poor in weather resistance and deterioration resistance.

Along with the heightened demand for solventless pressure-sensitive adhesives, attempts to obtain acrylic pressure-sensitive adhesives of a hot-melt type have been made.

Acrylic, hot-melt, pressure-sensitive adhesives described, for example, in Japanese Patent Application (OPI) Nos. 75975/1984, 125774/1983, 161484/1981, and 315409/1989 are generally unsatisfactory in cohesive force of the pressure-sensitive adhesives or workability in hot-melt coating.

Although, as a means of lessening the above drawbacks, a moisture-curing hot-melt adhesive composition is suggested in Japanese Patent Application (OPI) No. 259984/1991, since the composition comprises an alkyl (meth)acrylate, a macromer (macromolecular monomer), a (meth)acrylate that has a silyl group, and an isocyanate compound, the workability in hot-melt coating before moisture-curing is not satisfactory, and in particular, the operations are restricted severely by the toxic gas generated from the isocyanate compound when the composition is melted at a high temperature.

Further, the moisture-curing adhesive composition described in Japanese Patent Application (OPI) No. 139584/1991, which comprises an alkyl (meth)acrylate, a polymerizable polymer, and an unsaturated isocyanate, suffers from the drawback that the change with the passage of time in melt viscosity is large. Although this moisture-curing adhesive composition contains a styrene tackifier resin, in order to lower the melt viscosity, the tackiness is poor because the tackifier resin and the alkyl (meth)acrylate part are inappropriately compatible. In order to lessen the drawback of the large change with the passage of time in melt viscosity, a moisture-curing hot-melt adhesive composition comprising an alkyl (meth)acrylate, a polymerizable polymer, an unsaturated isocyanate, an organotin compound, and an organophosphorus compound is disclosed in Japanese Patent Application (OPI) No. 31482/1992, but making the change in melt viscosity small by adding an organophosphorus compound results in the drawback that the moisture-curing speed becomes slow. Further, if graft copolymers described in Japanese Patent Application Nos. 139584/1991 and 31482/1992 are used alone, the initial adhesion before moisture-curing and the initial cohesive force are insufficient, even if the melt viscosity is brought to a suitable melt viscosity (100,000 cps or less) at a relatively low temperature (about 120° C.), in order to attain excellent workability in coating.

In general, complete curing of moisture-curing hot-melt adhesive compositions must take at least 3 to 7 days, which causes problems with productivity and the like.

On the other hand, actinic-radiation-curing, hot-melt, pressure-sensitive adhesives described in Japanese Patent Application (OPI) Nos. 276879/1990, 119082/1991, and 220275/1991 are suggested, but they are accompanied by problems that the melting temperature is as high as 150° C., the melt viscosity increases with time, and compounds having molecular weights less than 1,000 volatilize.

Although Japanese Patent Application (OPI) No. 1109873/1982 suggests an ionizing-radiation-curing adhesive composition comprising an acrylic copolymer having a molecular weight of 1,000 to 50,000, to which side chains having an olefinically unsaturated bond are introduced, the cohesive force and adhesive force of the obtained adhesive are not satisfactory, particularly in the adhesive thickness of more than 40 μm.

Thus, as matters now stand, there are no acrylic, hot-melt, pressure-sensitive adhesive compositions that satisfactorily meet the demand of the market; and hot-melt pressure-sensitive adhesive compositions wherein the change in melt viscosity after the lapse of time before curing is small (melt viscosity stability is high), excellent coating workability in hot-melt is exhibited, and the adhesive force and the heat-resistant cohesive force after curing are excellent, are strongly desired.

SUMMARY OF THE INVENTION

The object of the present invention is to provide an actinic-radiation-curing, hot-melt, pressure-sensitive adhesive composition wherein the drawbacks of conventional acrylic, hot-melt, pressure-sensitive adhesives are eliminated; in particular the change with the passage of time in melt viscosity before curing is small, excellent coating workability in hot-melt is exhibited, and the adhesive force and the heat-resistant cohesive force after curing are excellent.

Another object of the present invention is to provide an acrylic, actinic-radiation-curing, hot-melt, pressure-sensitive adhesive composition wherein the drawbacks of conventional acrylic, hot-melt, pressure-sensitive adhesive are overcome; in particular the coating workability in hot-melt at a low temperature (of about 80° to 100° C.) before curing is excellent, the composition volatilizes less, the curing reaction can be carried out using a small exposure dose of actinic radiation (typically ultraviolet rays or an electron beam), and the heat-resistant cohesive force after curing is excellent.

Other and further objects, features and advantages of the invention will appear more evident from the following description.

DETAILED DESCRIPTION OF THE INVENTION

The inventors have studied keenly to attain the above object to reach the present invention. That is, the present invention provides:

An actinic-radiation-curing, hot-melt, pressure-sensitive adhesive composition, which comprises 90 to 50 parts by weight of a high-molecular-weight polymer (A), wherein, to a main chain that is made up of, as a main component, an alkyl (meth)acrylate whose alkyl group has 1 to 12 carbon atoms and has a number-average molecular weight of 8,000 to 100,000 and has a glass transition temperature of $-75°$ to $-20°$ C. at least one polymer component that is made by copolymerization of at least one monomer having an ethylenically unsaturated group in the molecule and has a number-average molecular weight of 500 to 30,000 and a glass transition temperature of $-80°$ to $100°$ C. is bonded as a branched chain, and the branched chain and/or the main chain has at least one ethylenically unsaturated group; and 10 to 50 parts by weight of a low-molecular-weight polymer (B) that is made by copolymerization of at least one monomer having at least one ethylenically unsaturated group, having or not having an ethylenically unsaturated group in the polymer and has a number-average molecular weight of 500 to 8,000 and a glass transition temperature of $-60°$ to $100°$ C. and has at least one ethylenically unsaturated group or not.

The embodiments of the present invention are as follows:

(1) An actinic-radiation-curing, hot-melt, pressure-sensitive adhesive composition, which comprises 50 to 90 parts by weight of a mixture of one or more high-molecular-weight polymers selected from the group of the below-mentioned high-molecular-weight polymers (AI), which polymer has at least one ethylenically unsaturated group in the molecule and a number-average molecular weight of 10,000 to 100,000, and 50 to 10 parts by weight of the below-mentioned low-molecular-weight polymer (BI), which polymer has at least one ethylenically unsaturated group or does not have ethylenically unsaturated groups and with a number-average molecular weight of 500 to 8,000, (AI) High-molecular-weight copolymers having at least one ethylenically unsaturated group:

1) High-molecular-weight copolymer ($AI_1$) having at least one ethylenically unsaturated group in the molecule that is prepared by copolymerizing a monomer (c) having an ethylenically unsaturated group and a reaction-active group in the molecule, a macromonomer (da) having an ethylenically unsaturated group at the end of the molecule, a number-average molecular weight of 2,000 or more, and a glass transition temperature of $20°$ C. or higher, and an alkyl (meth)acrylate (e) whose alkyl group has 1 to 12 carbon atoms, followed by reaction with a monomer (f) having an ethylenically unsaturated group and a group capable of reacting with the above reaction-active group in the molecule, wherein the glass transition temperature of the alkyl (meth)acrylate moiety of the copolymer is $-75°$ to $-20°$ C., 2) High-molecular-weight polymer ($AI_2$) having at least one ethylenically unsaturated group in the molecule that are prepared by copolymerizing a monomer (c) having an ethylenically unsaturated group and a reaction-active group in the molecule, with an alkyl (meth)acrylate (e) whose alkyl group has 1 to 12 carbon atoms, in the presence of a thermoplastic resin (g), followed by reaction with a monomer (f) having an ethylenically unsaturated group and a group capable of reacting with the above reaction-active group in the molecule, wherein the glass transition temperature of the alkyl (meth)acrylate moiety of the copolymer is $-75°$ to $-20°$ C., (BI) Low-molecular-weight polymers:

1) Low-molecular-weight polymer ($BI_1$) having a glass transition temperature of $-30°$ to $80°$ C. and at least one ethylenically unsaturated group in the molecule that is prepared by copolymerizing at least one monomer selected from the group of vinyl acetate and alkyl (meth)acrylates (e) whose alkyl group has 1 to 12 carbon atoms, with a monomer (c) having a vinyl group and an reaction-active group in the molecule, followed by reaction with a monomer (f) having an ethylenically unsaturated group and a group capable of reacting with the above reaction-active group in the molecule, 2) Low-molecular-weight polymer ($BI_2$) having a glass transition temperature of $-30°$ to $80°$ C. and not having ethylenically unsaturated groups in the molecule that is prepared by copolymerizing at least one monomer selected from the group of vinyl acetate and alkyl (meth)acrylates (e) whose alkyl group has 1 to 12 carbon atoms (hereinafter referred to as the first embodiment).

(2) An actinic-radiation-curing, hot-melt, pressure-sensitive adhesive composition, which comprises 10 to 90 parts by weight of the below-mentioned high-molecular-weight polymer (AII), which polymer has at least one ethylenically unsaturated group in the molecule and a number-average molecular weight of 10,000 to 100,000, and 90 to 10 parts by weight of the below-mentioned low-molecular-weight polymer (BII), which polymer has at least one ethylenically unsaturated group or does not have ethylenically unsaturated groups and has a number-average molecular weight of 500 to 8,000, High-molecular-weight copolymer (AII):

High-molecular-weight copolymer having at least one ethylenically unsaturated group in the molecule that is prepared by copolymerizing a monomer (c) having an ethylenically unsaturated group in the molecule and a reaction-active group in the molecule, a reactive polymer (d) having an ethylenically unsaturated group at the inner part of molecule, a number-average molecular weight of 2,000 or more, and a glass transition temperature of $20°$ C. or higher, and an alkyl (meth)acrylate (e) whose alkyl group has 1 to 12 carbon atoms, followed by reaction with a monomer (f) having an ethylenically unsaturated group and a group capable of reacting with the above reaction-active group-in the molecule, wherein the glass transition temperature of the alkyl (meth)acrylate moiety of the copolymer is $-75°$ to $-20°$ C., Low-molecular-weight polymers (BII): one of the following low-molecular-weight copolymer ($BII_1$), ($BII_2$), or ($BII_3$), or a mixture thereof, 1) Low-molecular-weight polymer (BII$_1$) having a glass transition temperature of −60° to 80° C. and at least one ethylenically unsaturated group that is prepared by copolymerizing at least one monomer selected from the group of vinyl acetate and alkyl (meth)acrylates (e) whose alkyl group has 1 to 12 carbon atoms, with a monomer (c) having an ethylenically unsaturated group and a reaction-active group in the molecule, followed by reaction with a monomer (f) having an ethylenically unsaturated group and a group capable of reacting with the above reaction-active group in the molecule,
2) Low-molecular-weight polymer (BII$_2$) having a glass transition temperature of −60° to 80° C. and not having ethylenically unsaturated groups that is prepared by copolymerizing at least one monomer selected from the group of vinyl acetate and alkyl (meth)acrylates (e) whose alkyl group has 1 to 12 carbon atoms,
3) Low-molecular-weight polymer (BII$_3$) having a glass transition temperature of −60° to 80° C. and having at least one ethylenically unsaturated group at the end of the molecule that has main component prepared by copolymerizing at least one monomer selected from the group of vinyl acetate and alkyl (meth)acrylates (e) whose alkyl group has 1 to 12 carbon atoms (hereinafter referred to as the second embodiment).

(3) An actinic-radiation-curing, hot-melt, pressure-sensitive adhesive composition, which comprises 5 to 200 parts by weight of a low-molecular-weight polymer (BIII), which polymer has two or more ethylenically unsaturated groups in the molecule, a glass transition temperature of lower than 100° C., and a number-average molecular weight of 1,500 to 6,000; and 100 parts by weight of a high-molecular-weight polymer (AIII), whose main chain is mainly made up of an alkyl (meth)acrylate whose alkyl group has 1 to 12 carbon atoms, and has a number-average molecular weight of 8,000 to 100,000 and a glass transition temperature of −75° to −20° C.; and to this main chain, a low-molecular-weight polymer component, having a glass transition temperature of lower than 100° C. and a number-average molecular weight of 1,500 to 6,000, is bonded as a branched chain, and the branched chain has at least one ethylenically unsaturated group (hereinafter referred to as the third embodiment).

(4) An actinic-radiation-curing, hot-melt, pressure-sensitive adhesive composition, which comprises 90 to 50 parts by weight of a high-molecular-weight polymer (AIV), wherein, to a main chain that is made up of, as a main component, an alkyl (meth)acrylate whose alkyl group has 1 to 12 carbon atoms and has a number-average molecular weight of 8,000 to 100,000 and has a glass transition temperature of −75° to −20° C., a low-molecular-weight polymer component that is made by copolymerization of at least one monomer having an ethylenically unsaturated group in the molecule and has a number-average molecular weight of 500 to 30,000 and a glass transition temperature of −80° to 100° C. is bonded as a branched chain, and the branched chain and the main chain has at least one ethylenically unsaturated group; and 10 to 50 parts by weight of the below-mentioned low-molecular-weight polymer (BIV), which polymer has at least one ethylenically unsaturated group or does not have ethylenically unsaturated groups in the molecule and has a number-average molecular weight of 500 to 8,000, High-molecular-weight copolymer (AIV):
High-molecular-weight copolymer having ethylenically unsaturated groups in the molecule that is prepared by copolymerizing a monomer (c) having an ethylenically unsaturated group and a reaction-active group in the molecule, a reactive polymer (d) having at least one ethylenically unsaturated group and at least one reaction-active group in the molecule, a number-average molecular weight of 500 to 30,000, and a glass transition temperature of −80° to 100° C., and an alkyl (meth)acrylate (e), whose alkyl group has 1 to 12 carbon atoms, followed by reaction with a monomer (f) having an ethylenically unsaturated group and a group capable of reacting with the above reaction-active group in the molecule, wherein the glass transition temperature of the alkyl (meth)acrylate moiety of the copolymer is −75° to −20° C., Low-molecular-weight polymers (BIV): one of the following low-molecular-weight copolymer (BIV$_1$), (BIV$_2$), or (BIV$_3$), or a mixture thereof, 1) Low-molecular-weight polymer (BIV$_1$) having a glass transition temperature of −80° to 100° C. and at least one ethylenically unsaturated group that is prepared by copolymerizing at least one monomer having an ethylenically unsaturated group in the molecule, with a monomer (c) having an ethylenically unsaturated group and a reaction-active group in the molecule, followed by reaction with a monomer (f) having an ethylenically unsaturated group and a group capable of reacting with the above reaction-active group in the molecule,
2) Low-molecular-weight polymer (BIV$_2$) having a glass transition temperature of −80° to 100° C. and not having ethylenically unsaturated groups that is prepared by copolymerizing at least one monomer selected from the group of vinyl acetate and alkyl (meth)acrylates (e) whose alkyl group has 1 to 12 carbon atoms,
3) Low-molecular-weight polymer (BIV$_3$) having a glass transition temperature of 80° to 100° C. and having at least one ethylenically unsaturated group at the end of the molecule that has main component prepared by copolymerizing at least one monomer having an ethylenically unsaturated group in the molecule (hereinafter referred to as the fourth embodiment).

In the specification and claims of the present invention, the term "(meth)acrylate" means an acrylate or a methacrylate.

Every Tg value of the high-molecular weight polymer described and measured in this specification including Examples and claims designates that of the moiety of alkyl (meth)acrylate, and in particular that of the moiety of alkyl (meth)acrylate in the main chain part if it exists both in a main chain and a branched chain.

The present invention will be described in detail.

First Embodiment

The first embodiment is described below in detail.

The number-average molecular weight of the high-molecular weight polymer (AI) for use in the first embodiment is generally 10,000 to 100,000, preferably 10,000 to 90,000, and more preferably 10,000 to 80,000.

If the number-average molecular weight is too small, the cohesive force of the pressure-sensitive adhesive is insufficient and the retention force against heat-resistance after curing is unsatisfactory.

Further, if the number-average molecular weight is too large, the melt viscosity of the pressure-sensitive adhesive is too high and therefore the coating workability becomes poor.

Further, in the high-molecular-weight polymer (AI), the glass transition temperature of the alkyl (meth)acrylate moiety is generally $-75°$ to $-20°$ C., preferably $-70°$ to $-20°$ C., and more preferably $-70°$ to $-30°$ C. If the glass transition temperature is lower than $-75°$ C., the cohesive force of the pressure-sensitive adhesive is insufficient, while if it exceeds $-20°$ C., the adhesive force after curing is insufficient. In the present invention, the glass transition temperature of the alkyl (meth)acrylate moiety can be measured by a differential scanning calorimeter (DSC).

The methods for preparing the high-molecular-weight polymers ($AI_1$) and ($AI_2$) are now described.

The high-molecular-weight polymer ($AI_1$) can be prepared by copolymerizing a monomer (c) having an ethylenically unsaturated group and a reaction-active group in the molecule, a macromonomer (da), and an alkyl (meth)acrylate (e) whose alkyl group has 1 to 12 carbon atoms, for example, by solution polymerization, generally in a solvent in the presence of a polymerization initiator leaving the reaction-active group unreacted. Then the monomer (f) having an ethylenically unsaturated group and a group capable of reacting with the above reaction-active group in the molecule is reacted to the polymer. The macromonomer (da) is considered to be bonded as a branched chain to a main chain of copolymer of monomer (c) and alkyl(meth)acrylate (e). Monomer (f) reacts to the main chain by its reaction of the group capable of reacting with the reaction-active group comes from monomer (c) and presents on the main chain leaving the ethylenically unsaturated group unreacted.

This reaction system is basically identical for the other high-molecular-weight polymer.

The proportions of the components to be used for the high-molecular-weight polymer ($AI_1$) are preferably such that the proportion of the monomer (c) is 0.05 to 10 wt %, the proportion of the macromonomer (da) is 2 to 30 wt %, the proportion of the alkyl (meth)acrylate (e) is 97.9 to 50 wt %, and the proportion of the monomer (f) is 0.05 to 10 wt %.

The high-molecular-weight polymer ($AI_2$) can be prepared by copolymerizing a monomer (c) having an ethylenically unsaturated group and a reaction-active group in the molecule with, an alkyl (meth)acrylate (e), whose alkyl group has 1 to 12 carbon atoms, generally in a previously prepared solution of a thermoplastic resin (g) in a solvent, by solution polymerization in the presence of a polymerization initiator, followed by reaction with a monomer (f) having an ethylenically unsaturated group and a group capable of reacting with the above reaction-active group. In the high-molecular-weight polymer ($AI_2$), the thermoplastic resin is presumed to be a branched chain by bonding to the main chain at a point.

The proportions of the components used for the high-molecular weight polymer ($AI_2$) are preferably such that the proportion of the thermoplastic resin (g) is 2 to 30 wt %, the proportion of the monomer (c) is 0.05 to 10 wt %, the proportion of the alkyl (meth)acrylate (e) is 97.9 to 50 wt %, and the proportion of the monomer (f) is 0.05 to 10 wt %.

The number-average molecular weight of the low-molecular-weight polymer (BI) for use in the present invention is generally 500 to 8,000, preferably 500 to 7,000, and more preferably 500 to 6,000. If the number-average molecular weight is less than 500, the cohesive force of the pressure-sensitive adhesive is insufficient and the retention force against heat-resistance is unsatisfactory. Further, if the number-average molecular weight exceeds 8,000, the melt viscosity of the pressure-sensitive adhesive is too high and therefore the workability in coating becomes poor. Further, the glass transition temperature of the low-molecular weight polymer (BI) is generally $-30°$ to 80° C., preferably $-30°$ to 70° C., and more preferably $-20°$ to 70° C. If the glass transition temperature is lower than $-30°$ C. the cohesive force of the pressure-sensitive adhesive is insufficient, while if the glass transition temperature exceeds 80° C., the adhesive force is insufficient.

Fifty to 10 parts by weight of the low-molecular-weight polymer (BI) is mixed with 50 to 90 parts by weight of the high-molecular-weight polymer (AI). The weight ratio of the high-molecular-weight polymer (A) to the low-molecular-weight polymer (BI) is preferably from 60 to 90: from 40 to 10, more preferably from 60 to 80: from 40 to 20. If the amount of the high-molecular-weight polymer (AI) is too small, the cohesive force of the pressure-sensitive adhesive is insufficient, while if the amount is too large, the melt viscosity of the adhesive is too high and therefore the coating workability becomes poor.

The methods for preparing the low-molecular-weight polymers ($BI_1$) and ($BI_2$) are now described.

The low-molecular-weight polymer ($BI_1$) can be prepared by copolymerizing at least one monomer, selected from the group consisting of vinyl acetate and alkyl (meth)acrylates (e) whose alkyl group has 1 to 12 carbon atoms, with a monomer (c) having an ethylenically unsaturated group and a reaction-active group in the molecule, generally in a solvent in the presence of a polymerization initiator, for example, by solution polymerization, followed by reaction with a monomer (f) having an ethylenically unsaturated group and a group capable of reacting with the above reaction-active group.

The proportions of the components used for the low-molecular-weight polymer ($BI_1$) are preferably such that the proportion of the at least one monomer, selected from the group consisting of vinyl acetate and alkyl (meth)acrylates (e) whose alkyl group has 1 to 12 carbon atoms is 99.8 to 30 wt %, the proportion of the monomer (c) is 0.1 to 50 wt %, and the proportion of the monomer (f) is 0.1 to 50 wt %.

The low-molecular-weight polymer ($BI_2$) can be prepared by copolymerizing at least one monomer, selected from the group consisting of vinyl acetate and alkyl (meth)acrylates (e) whose alkyl group has 1 to 12 carbon atoms, generally in a solvent in the presence of a polymerization initiator, by solution polymerization.

By mixing prescribed amounts of the solution of the high-molecular-weight polymer (AI) and the solution of the low-molecular-weight polymer (BI) prepared in the above manner and removing the solvents, an adhesive can be prepared.

Second Embodiment

The second embodiment of the present invention is described below in detail.

With respect to the preferable and more preferable number-average molecular weight of the high-molecular-weight polymer, and the preferable and more preferable glass transition temperature of alkyl (meth)acrylate moiety of the high-molecular-weight polymer, the descriptions in the first embodiment are applied to this second embodiment.

Method for preparing the high-molecular-weight polymer (AII) for use in the second embodiment is described below.

The high-molecular-weight polymer (AII) can be prepared, basically, in the same manner as the high-molecular-weight polymer ($AI_1$) in the first embodiment, except that a reactive-polymer (d) is used instead of the macromonomer (da) for the polymer ($AI_1$).

The proportions of the components to be used for the high-molecular-weight polymer (AII) are basically same as those of the high-molecular-weight polymer ($AI_1$) in the first embodiment, except that the reactive-polymer (d) is used instead of the macromonomer (da) for the polymer ($AI_1$).

The reactive-polymer (d) for use in the present invention has a glass transition temperature of 20° C. or higher and a number-average molecular weight of 2,000 or more. When the glass transition temperature is too low, or the number-average molecular temperature is too small, the cohesive force of the pressure-sensitive adhesive after curing becomes insufficient. More preferably the reactive-polymer (d) has a number average molecular weight is too large, the melt viscosity of the pressure-sensitive adhesive becomes to high and therefore the coating workability becomes poor.

The reactive polymer. (d) can be produced by copolymerizing at least one monomer selected from aromatic monomers, typically styrene, t-butylstyrene, α-methylstyrene, and vinyltoluene; (meth)acrylates (e); acrylonitrile; and vinyl acetate, with a monomer (c) having an ethylenically unsaturated group and an reaction-active group in the molecule, generally in a solvent in the presence of a polymerization initiator by solution polymerization so that the glass transition temperature may be 20° C. or over and the number-average molecular weight is 2,000 or over, followed by reaction with a monomer (f) having an ethylenically unsaturated group and a group capable of reacting with the above reaction-active group.

Methods for preparing the low-molecular-weight polymers ($BII_1$), ($BII_2$), and ($BII_3$) for use in the second embodiment are now described.

The low-molecular-weight polymer ($BII_1$) and ($BII_2$) can be prepared in the same manner as ($BI_1$) and ($BI_2$).

The low-molecular-weight polymer ($BII_3$) has an ethylenically unsaturated group, such as a methacryloyl group or an acryloyl group, introduced to the end of the molecule and can be synthesized by the living anion termination process or the chain transfer polymerization process. The living anion termination process is a synthesis process wherein at least one monomer, selected from the group consisting of vinyl acetate and alkyl (meth)acrylates (e) whose alkyl group has 1 to 12 carbon atoms, is subjected to living anion polymerization, and its growing living anion is reacted with a stopper agent having a double bond; this process is disclosed by Milkovich et al. as described in U.S. Pat. Nos. 3,786,116 and 3,842,059. A second method of the termination comprises introducing an alkylene oxide, such as ethylene oxide, into a living anion, to convert it to an alkoxide ion, which is in turn, protonized to introduce a hydroxy-terminated polymer. Then, the hydroxyl group is reacted, for example, with an isocyanate alkyl (meth)acrylate, whose alkyl group has 1 to 4 carbon atoms, thereby synthesizing a low-molecular-weight polymer having a vinyl group. In the chain transfer polymerization process, radical polymerization can be carried out using a polymerization initiator, such as 4,4'-azobis-4-cyano-valeric acid and the like, in the presence of a chain-transfer agent, such as thioglycolic acid and the like, to introduce a functional group such as carboxyl group, at the end of the polymer, or using a polymerization initiator, such as 2,2'-azobis-2-hydroxypropionitrile, in the presence of a chain-transfer agent, such as 2-mercapto ethanol, to introduce a functional group, such as hydroxyl group, at the end of the polymer. Using these processes, a group capable of reacting with the below reaction-active group, such as a carboxyl group and a hydroxyl group, can be introduced to the end of the molecule. Then by reacting with the monomer (f) having an ethylenically unsaturated group and a group (e.g., glycidyl group, NCO group) capable of reacting with the above reaction-active group, the ethylenically group can be added.

The glass transition temperature of the low-molecular-weight polymer (BII) is generally −60° to 80° C., preferably −60° to 70° C., more preferably −50° to 70° C. When it is too low, the cohesive force of the pressure-sensitive adhesive is insufficient, and when it is too high, the adhesive force of the pressure-sensitive adhesive is insufficient.

To 10 to 90 parts by weight of the above-mentioned high-molecular-weight polymer (AII), 90 to 10 parts by weight of the above-mentioned low-molecular-weight polymer (BII) is added and combined. The weight ratio of high-molecular-weight polymer to low-molecular-weight polymer is preferably 20/80 to 80/20, more preferably 30/70 to 70/30. When the proportion of high-molecular-weight polymer (AII) is too small, the cohesive force of the pressure-sensitive adhesive is insufficient, and when it is too much, the adhesive force of the pressure-sensitive adhesive is insufficient.

Third Embodiment

The pressure-sensitive adhesive of the third embodiment of the present invention comprises a low-molecular-weight polymer (BIII) and a high-molecular-weight polymer (AIII).

The method for preparing the high-molecular-weight polymer (AIII) varies in accordance with the position of the low-molecular-weight polymer component that is bonded as the branched chain in the molecule. A high-molecular-weight polymer ($AIII_1$) has the branched chain component at the end of the molecule, while a high-molecular-weight polymer ($AIII_2$) has the branched chain component existing not at the end but at the inner part of the molecule.

The method for preparing the high-molecular-weight polymer ($AIII_1$) wherein the low-molecular-weight polymer component that is the branched chain component is bonded to the end of the molecule is described first.

1) The alkyl (meth)acrylate (e) that is the main chain can be synthesized, for example, by the living anion termination process or the chain transfer polymerization process. The living anion terminating process is a synthesis process wherein an alkyl (meth)acrylate (e) is subjected to living anion polymerization and its growing living anion is reacted with a stopper having an active group and is disclosed by Milkovich et al. as described in U.S. Pat. Nos. 3,786,116 and 3,842,059. The second method of the termination comprises introducing an alkylene oxide, such as ethylene oxide, into a living anion to convert it to an alkoxide ion, which is in turn protonized to introduce a hydroxyl group to the end of the molecule. In the chain transfer polymerization process, radical polymerization can be carried out using a polymerization initiator, such as 4,4'-azobis-4-cyanovaleric acid and the like, in the presence of a chain-transfer agent, such as thioglycolic acid and the like, to introduce a functional group such as carboxyl group, at the end of the polymer, or using a polymerization initiator, such as 2,2'-azobis-2-hydroxy-propionitrile, in the pressure of a chain-transfer agent, such as 2-mercapto ethanol, to introduce a functional group, such as hydroxyl group, at the end of the polymer. Using these processes, a group capable of reacting with the below reaction-active group, such as a carboxyl group and a hydroxyl group, can be introduced to the end of the molecule.

2) A low-molecular-weight polymer base having two or more reaction-active groups, such as a glycidyl group or an isocyanate group, at the inner part of the molecule, can be reacted to produce a high-molecular-weight polymer base having a low-molecular-weight component bonded to the end of the molecule. This high-molecular-weight polymer base has a low-molecular-weight polymer component bonded to the end of the molecule, and the low-molecular-weight polymer component has one or more groups that remain active.

3) This polymer base is reacted with a monomer (f) that has an ethylenically unsaturated group and a group capable of reacting with that reaction-active group, such as hydroxyethyl acrylate and acrylic acid, thereby obtaining a high-molecular-weight polymer (AIII$_1$), having at the end of the molecule a low-molecular-weight polymer component that has at least one ethylenically unsaturated group, can be synthesized.

In any cases described above, when the low-molecular-weight polymer base is added to bond it to the high-molecular-weight polymer main chain, the former polymer base may be added in excess over the amount that is required to react with the latter polymer, thereby utilizing the excess low-molecular-weight polymer base remained unbonded after by reacting with the monomer (f) having an ethylenically unsaturated group and a group capable of reacting with the above reaction-active group, as a low-molecular-weight polymer which is a component in the uniform adhesive composition.

If the low-molecular-weight component is bonded at the inner part of the high-molecular-weight molecule, 1) an alkyl (meth)acrylate (e) whose alkyl group has 1 to 12 carbon atoms and a monomer (f) having an ethylenically unsaturated group and a group capable of reacting with the above reaction-active group in the molecule can be copolymerized, generally in a solvent, in the presence of a polymerization initiator, by solution polymerization, to introduce the group capable of reacting with the above reaction-active group or groups, thereby forming a high-molecular-weight polymer main chain, 2) then a low-molecular-weight polymer base, having two or more of the above reaction-active groups in the molecule, is reacted, to produce a high-molecular-weight polymer base that has a low-molecular-weight component bonded in the molecule. This high-molecular-weight polymer base has a low-molecular-weight component in the molecule, and, in the low-molecular-weight component, one or more groups that remain active.

3) This high-molecular-weight polymer base is reacted with a monomer (f) that has an ethylenically unsaturated group and a group capable of reacting with the reaction-active group, thereby obtaining a high-molecular-weight polymer (AIII$_2$) having in the molecule a low-molecular-weight polymer component that has at least one ethylenically unsaturated group, can be synthesized.

The preferable proportions of the components used in the high-molecular-weight polymer (AIII) are such that the proportion of the alkyl (meth)acrylate (e), which is the backbone part, is 98.50 to 10 wt %; the proportion of the monomer (f) is 0.05 to 10 wt %; the proportion of the low-molecular-weight polymer base that is the branched chain is 0.05 to 70 wt %; and the proportion of the monomer (f) to be reacted with the reaction-active group of the low-molecular-weight polymer component is 0.05 to 10 wt %.

The low-molecular-weight polymer (BIII) can be prepared by copolymerizing at least one monomer—selected from the group consisting of aromatic monomers, typically styrene, t-butylstyrene, α-methylstyrene, and vinyltoluene; (meth)acrylates (e); acrylonitrile; vinyl acetate, and the like—with a monomer (c) having an ethylenically unsaturated group and a reaction-active group in the molecule, such as m-isopropenyl-α,α'-dimethylbenzyl isocyanate, glycidyl methacrylate, acrylic acid, and hydroxyethyl acrylate, generally in a solvent in the presence of a polymerization initiator, by solution polymerization, to obtain a low-molecular-weight polymer base, so that the low-molecular-weight polymer base may have a glass transition temperature of lower than 100° C., a number-average molecular weight of 1,500 to 6,000, and two or more reaction-active groups in the molecule. Then, by the reaction of this low-molecular-weight polymer base with a monomer (f) having an ethylenically unsaturated group and a group capable of reacting with the above reaction-active group; examples of the monomer (f) include m-isopropenyl-α,α'-dimethylbenzyl isocyanate, glycidyl methacrylate, acrylic acid, and a hydroxyethylacrylate. The monomer (f) can be used in a suitable combination with the reaction-active group of the monomer (c); for example, if the active group of the monomer (c) is an isocyanate group, as the monomer (f), a monomer having a hydroxyl group, such as hydroxyethyl (meth)acrylate and hydroxypropyl (meth)acrylate, can be reacted with the active group that comes from the monomer (c); and if the active group of the monomer (c) is a carboxyl group, as the monomer (f), a monomer having a glycidyl group, such as glycidyl (meth)acrylate, is reacted with the active group that comes from the monomer (c).

Five to 200 parts by weight of the low-molecular-weight polymer (BIII) is mixed with 100 parts by weight of the high-molecular-weight polymer (AIII). The weight ratio of the low-molecular-weight polymer is preferably 5 to 180 parts by weight, more preferably 5 to 150 parts by weight, to 100 parts by weight of the high-molecular-weight polymer. If the weight ratio of the low-molecular-weight polymer is too large, the cohesive force of the pressure-sensitive adhesive is insufficient, while if the ratio is too small, the melt viscosity of the adhesive increases, resulting lowering the hot-melt workability.

The number-average molecular weight of the low-molecular-weight polymer (BIII) of the present invention is generally 1,500 to 6,000, preferably 1,500 to 5,000, more preferably 1,000 to 4,000. When the molecular weight is too high, the melt viscosity of the pressure-sensitive adhesive becomes too high, and therefore the coating workability becomes poor. The glass transition temperature of the low-molecular-weight polymer (BIII) is preferably lower than 100° C. When the temperature is too high, the melt viscosity of the pressure-sensitive adhesive increases, resulting lowering the hot-melt coating workability.

The number-average molecular weight of the high-molecular-weight polymer (AIII) of the present invention is generally 8,030 to 100,000, preferably 8,000 to 50,000, more preferably 8,000 to 80,000. When the molecular weight is too small, the cohesive force of the pressure-sensitive adhesive is insufficient and the retention force against heat-resistance after curing is unsatisfactory. When it is too high, the coating workability becomes poor because of high melt viscosity of the pressure-sensitive adhesive.

In the high-molecular-weight polymer (AIII), the glass transition temperature of alkyl (meth)acrylate moiety that is the main chain is −75° to 20° C., preferably −70° to −20° C., more preferably −70° to −30° C. When the glass transition temperature is too low, the cohesive force of the pressure-sensitive adhesive is insufficient, and when it is too high, the adhesive force after curing is insufficient. In the present invention, the glass transition temperature of alkyl (meth)acrylate moiety can be determined by a differential scanning thermometer (DSC). The number-average molecular weight of the low-molecular-weight polymer to be bonded as the branched chain is, as same as the above-mentioned low-molecular-weight polymer, generally 1,500 to 6,000, preferably 1,500 to 5,000, more preferably 1,500 to 4,000. When the number-average molecular weight is too high, the melt viscosity of the pressure-sensitive adhesive becomes too high, and therefore the coating workability becomes poor. The glass transition temperature of the low-molecular-weight polymer for the branched chain is generally lower than 100° C. When it is too high, the melt viscosity of the pressure-sensitive adhesive becomes too high, and therefore the coating workability becomes poor.

The preferable proportion of raw materials for use in the preparation of low-molecular-weight polymer (BIII) are such that, for the low-molecular-weight polymer base, the proportion of the at least one monomer, selected from the group consisting of aromatic monomers, typically styrene, t-butylstyrene, α-methylstyrene, and vinyltoluene; (meth)acrylates (e); acrylonitrile; vinyl acetate, and the like, is 98.00 to 10.00 wt %; and the proportion of the monomer (c), having an ethylenically unsaturated group and a reaction-active group in the molecule is 1.00 to 45.00 wt %; and the proportion of the monomer (f), having an ethylenically unsaturated group and a group capable of reacting with the above reaction-active group is 1.00 to 45.00 wt %.

Fourth Embodiment

The fourth embodiment is described below in detail.

The methods for preparing the high-molecular-weight polymer (AIV) is now described.

The high-molecular-weight polymer (AIV) can be prepared by copolymerizing a monomer (c) having an ethylenically unsaturated group and a reaction-active group in the molecule, a reactive polymer (d) having an ethylenically unsaturated group in the molecule, and an alkyl (meth)acrylate (e), for example, by solution polymerization, generally in a solvent in the presence of a polymerization initiator, followed by reacting with the monomer (f) having an ethylenically unsaturated group and a group capable of reacting with the above reaction-active group in the molecule.

In this case, it is possible to utilize the low-molecular-weight polymer base described above for the third embodiment. In this case, first a mixture of reactive polymer and low-molecular-weight polymer base can be prepared by reacting the reaction-active group that is present on the low-molecular-weight polymer base with a monomer (f) having an ethylenically unsaturated group and a group capable of reacting with the reaction-active group, and the reactive polymer (d) in the mixture of reactive polymer and low-molecular-weight polymer can be utilized. Thus a mixture of high-molecular-weight polymer (AIV) and low-molecular-weight polymer (BIV) is prepared.

An actinic-radiation-curing, hot-melt, pressure-sensitive adhesive composition can be prepared by mixing the high-molecular-weight polymer (AIV) and the low-molecular-weight polymer (BIV), which are prepared by above-described methods, and then removing the solvent.

More specifically, the high-molecular copolymer (IV) can be prepared by the following method:
1) First, the low-molecular-weight polymer base having two or more reaction-active groups in the molecule, as described in the method for preparing the low-molecular-weight polymer of the third embodiment, is reacted with the monomer (f) having an ethylenically unsaturated group and a group capable of reacting with the reaction-active group, in an amount of 1 mol per mol of the former low-molecular-weight polymer base, thereby preparing a polymerizable low-molecular-weight component (h) having an ethylenically unsaturated group and one reaction-active group, 2) Then, this polymerizable low-molecular-weight component (h) can be copolymerized with the alkyl (meth)acrylate (e) and the monomer having an ethylenically unsaturated group and the same reaction-active group as in the said component (h). This copolymerization can be carried out generally by a solution copolymerization in a solvent, in the presence of a polymerization initiator, thereby obtaining the high-molecular-weight polymer base comprising a main chain and a branched chain composed of the low-molecular-weight component, wherein both the main chain and branched chain have at least one reaction-active group, 3) By reacting this high-molecular-weight polymer base with a monomer (f) having an ethylenically unsaturated group and a group capable of reacting with the reaction-active group, a high-molecular-weight polymer having ethylenically unsaturated groups both in the main chain and the branched chain can be obtained.

The proportions of the components to be used for the high-molecular-weight polymer (AIV) are preferably such that the proportion of the polymerizable low-molecular-weight component (h) is 96.9 to 40 wt %, the proportion of the alkyl (meth)acrylate (e) is 3 to 40 wt %, and the proportion of the monomer (f) is 0.1 to 20 wt %.

The number-average molecular weight of the high-molecular-weight polymer (AIV) is preferably 10,000 to 90,000, more preferably 10,000 to 80,000. With respect to the preferable and more preferable glass transition temperature of alkyl (meth)acrylate moiety of the high-molecular-weight polymer, the description in the first embodiment is applied to this fourth embodiment.

The low-molecular-weight polymers (BIV$_1$), (BIV$_2$), and (BIV$_3$) can be prepared, basically, by the same methods for preparing low-molecular-weight polymers (BIII), (BII$_2$), and (BII$_3$), respectively.

With respect to the preferable and more preferable mixing ratio of the high-molecular-weight polymer and the low-molecular-weight polymer, the description in the first embodiment is applied to this fourth embodiment.

In the description and claims of the present invention, the low-molecular-weight polymer having the same structure as the other can be used in common, and thus the description of one embodiment can be applied to another embodiment.

The following is the common description for the present invention.

Now, raw materials or components used in the production of the high-molecular-weight polymers (A1 to AIV) and the low-molecular-weight polymers (B1 to BIV) are described.

With respect to the ethylenically unsaturated group in the high-molecular-weight polymer, the number of the ethylenically unsaturated groups when it is contained only in the main chain is preferably 0.005 to 10, more preferably 0.001 to 5, most preferably 0.05 to 3, per 1,000 of molecular weight of the high-molecular-weight polymer. When the amount is too small, the heat-resistant cohesive force is insufficient, though when the number is too large, the tack becomes insufficient. In the case where the ethylenically unsaturated group is contained only in the branched chain, preferably the number of ethylenically unsaturated group is 0.02 or more per 1,000 of molecular weight of the high-molecular-weight polymer. When the number of ethylenically unsaturated group is too small, the heat resistant cohesive force is insufficient, and the more the ethylenically unsaturated groups are, the better. When the ethylenically unsaturated groups are contained in both the main chain and the branched chain, preferably the number of ethylenically unsaturated group is 0.001 to 5 in the main chain and 0.01 or more in the branched chain, per 1,000 of the molecular weight, respectively.

As the monomer (c) having an ethylenically unsaturated group and a reaction-active group in the molecule, can be mentioned at least one monomer selected from the group consisting of monomers having as an active group an isocyanate group, typically m-isopropenyl-$\alpha,\alpha'$-dimethylbenzyl isocyanate, p-isopropenyl-$\alpha,\alpha$-dimethylbenzyl isocyanate, methacryloyl isocyanate, 2-methacryloyloxymethyl isocyanate, 2-methacrloyloxyethyl isocyanate, 2-methacryloyloxypropyl isocyanate, acryloyl isocyanate, acryloyloxymethyl isocyanate, acryloyloxyethyl isocyanate, and acryloyloxypropyl isocyanate; $\alpha,\beta$-unsaturated carboxylic acids and their anhydride, such as acrylic acid, methacrylic acid, crotonic acid, maleic acid, and fumaric acid; monomers having a hydroxyl group, such as hydroxyethyl (meth)acrylate and hydroxypropyl (meth)acrylate; monomers having a glycidyl group, such as glycidyl (meth)acrylate; and unsaturated carboxylic acid amides having an amido group, such as (meth)acrylamide, N-methylol(meth)acrylamide, N-butoxymethyl(meth)acrylamide, and diacetone(meth)acrylamide. Herein, the reaction-active group in the monomer (c) is selected from, for example, an isocyanate group, a hydroxyl group, a glycidyl group, and a carboxyl group, each of which can react chemically.

The macromonomer (da) for use in preparation of high-molecular-weight polymer (AI$_1$) is classified and included in the reactive polymers (d) that has a number-average molecular weight of 2,000 or more and a glass transition temperature of 20° C. or higher. The glass transition temperature of the reactive polymer (d) is preferably 20° to 100° C., and at least one ethylenically unsaturated group is contained in the reactive polymer (d), although the macromonomer (da) contains one ethylenically unsaturated group at the end of the molecule. In the present invention, the reactive polymer has at least one, preferably 1 to 2 of ethylenically unsaturated group at the inner part of the molecule. Macromonomer (da) is classified in one kind of reactive polymer (d), but macromonomer of the present invention has an ethylenically unsaturated group at the end of molecule.

Reactive polymer employed in the present invention has at least one ethylenically unsaturated group and at least one reaction-active group in the molecule. The ethylenically unsaturated group can position at the end or at the inner part of the reactive polymer, but the latter is usual.

In the description and claims of the present invention, the ethylenically unsaturated group is used in such a broad sense that it includes vinyl group but instead of the former vinyl group may be used for the convenience sake of description.

The macromonomer (da) includes generally polystyrene, copolymer of styrene and acrylonitrile, poly(t-butyl styrene), poly($\alpha$-methyl styrene), polyvinyl toluene, and polymethyl methacrylate introduced vinyl group, such as methacryloyl group or acryloyl group at the terminal group, which can be prepared by living-anion-terminating method or chain transfer polymerization process and the like. The living-anion-terminating method comprises living-anionic-copolymerizing a monomer, such as styrene, acrylonitrile, vinyl toluene, t-butyl styrene, $\alpha$-methyl styrene, methyl methacrylate, or the like, and reacting the growth living anion with a terminating agent which has a double bond, to synthesize macromonomer, as disclosed by Milkovich et al. and as described in U.S. Pat. Nos. 3,786,116 and 3,842,059. The second method of terminating comprises introducing an alkylene oxide, such as ethylene oxide, in the living anion, to make alkoxide ion, further protonating, to obtain a hydroxy-terminated polymer. Then reacting a hydroxyl group with isocyanate alkyl acrylate or isocyanate methacrylate having 1 to 4 carbon atoms in its alkyl group, to synthesize a macromonomer that has a vinyl group.

In the chain transfer polymerization process, radical polymerization can be carried out using a polymerization initiator, such as 4,4'-azobis-4-cyanovaleric acid and the like, in the presence of a chain-transfer agent, such as thioglycolic acid and the like, to introduce a functional group such as carboxyl group in the terminal of the polymer, and reacting the functional group with, for example, glycidyl methacrylate and the like, to synthesize a macromonomer that has a vinyl group.

The macromonomer for use in the present invention has a glass transition temperature of 20° C. or over and a number-average molecular weight of 2,000 or over. In the case of a glass transition temperature of lower than 20° C. or a number-average molecular weight of less than 2,000, the cohesive force of the pressure-sensitive adhesive after curing becomes insufficient. It is more preferable to have a number-average molecular weight of 50,000 or less. When the number-average molecular weight is too large, the melting viscosity of the pressure-sensitive adhesive becomes too high, resulting coating properties become wrong.

The alkyl (meth)acrylate (e) is described below. With respect to the number of carbon atoms of the alkyl group of the alkyl (meth)acrylate (e), there is not any restriction, but preferably the number of carbon atoms of the alkyl group is 1 to 12. The alkyl (meth)acrylate (e) for use in the present invention includes one or more alkyl (meth)acrylates selected, for example, from methyl (meth)acrylate, ethyl (meth)acrylate, n-propyl (meth)acrylate, isopropyl (meth)acrylate, n-butyl (meth)acrylate, isobutyl (meth)acrylate, amyl (meth)acrylate, hexyl (meth)acrylate, heptyl (meth)acrylate, octyl (meth)acrylate, isooctyl (meth)acrylate, 2-ethylhexyl (meth)acrylate, decyl (meth)acrylate, lauryl (meth)acrylate, and pentyl (meth)acrylate. The suitable proportion thereof to be used is not particularly restricted and is preferably in the range described in the above second embodiment. Further more preferably it is recommended to select and use suitably one or more of the above alkyl (meth)acrylates (e) so that the glass transition temperature of the alkyl (meth)acrylate moiety of the high-molecular weight polymer (AI to AIV) may be in the range of $-75°$ to $-20°$ C.

As the monomer (f) having in the molecule an ethylenically unsaturated group and a group capable of reacting with the reaction-active group of the monomer (c), can be mentioned at least one monomer selected from the group consisting of monomers having an isocyanate group, typically m-isopropenyl-$\alpha,\alpha'$-dimethylbenzyl isocyanate, p-isopropenyl-$\alpha,\alpha'$-dimethylbenzyl isocyanate, methacrytoyl isocyanate, 2-methacryloyloxymethyl isocyanate, 2-methacryloyloxyethyl isocyanate, 2-methacryloyloxypropyl isocyanate, acryloyl isocyanate, acryloyloxymethyl isocyanate, acryloyloxyethyl isocyanate, and acryloyloxy-propyl isocyanate, and 1:1 addition reaction products of a polyisocyanate, such as tolylene diisocyanate, hexamethylene diisocyanate, and diphenylmethane diisocyanate, with hydroxyethyl (meth)acrylate, hydroxypropyl (meth)acrylate, acrylic acid, or methacrylic acid; $\alpha,\beta$-unsaturated carboxylic acids and their anhydride, such as acrylic acid, methacrylic acid, crotonic acid, maleic acid, and fumaric acid; monomers having a hydroxyl group, such as hydroxyethyl (meth)acrylate and hydroxypropyl (meth)acrylate; monomers having a glycidyl group, such as glycidyl (meth)acrylate; and unsaturated carboxylic acid amides having an amido group, such as (meth)acrylamide, N-methylol(meth)acrylamide, N-butoxymethyl(meth)acrylamide, and diacetone(meth)acrylamide.

The above-mentioned monomer (f) may be used in a suitable known combination with the monomer (c) according to the active group of the monomer (c), for example, if the active group of the monomer (c) is an isocyanate group, as the monomer (f), a monomer having a hydroxyl group, such as hydroxyethyl (meth)acrylate and hydroxypropyl (meth)acrylate, is reacted with the active group of the monomer (c), and if the active group of the monomer (c) is a carboxyl group, as the monomer (f), a monomer having a glycidyl group, such as glycidyl (meth)acrylate, is reacted with the active group of the monomer (c).

As the above-mentioned thermoplastic resin (g), there can be mentioned styrene-based block copolymer, such as styrene-isoprene-styrene block copolymeric resin, styrene-butadiene-styrene block copolymeric resin, styrene-ethylene-butylene-styrene block copolymer resin and styrene-ethylene-propyrene-styrene block copolymeric resin; polyethylene, ethylene-vinyl acetate copolymeric resin, ethylene-ethyl acrylate copolymeric resin, ethylene-methyl methacrylate copolymeric resin, styrene-alkyl (meth)acrylate graft copolymeric resin, styrene-alkyl (meth)acrylate-vinyl acetate graft copolymeric resin, ethylene-propylene copolymeric resin, butyl rubber, isoprene rubber, acryl resin, ethylene-butene copolymeric resin, ethylene-propylene-diene copolymeric resin, polyester, and polypropylene.

As a preferable polymerization initiator for use in the production of the high-molecular-weight polymer and the low-molecular-weight polymer in the present invention, for example, dicumyl peroxide, benzoyl peroxide, t-butyl peroxy-2-ethylexanoate, 1,1-bis(t-butylperoxy)-cyclohexane, $\alpha,\alpha'$-azobisisobutyronitrile, acetyl peroxide, t-butyl peroxypivalate, t-butyl hydroperoxide, cumene hydroperoxide, t-hexyl peroxypivalate, 2,2'-azobis-(2,4-dimethylvaleronitrile), lauroyl peroxide, t-butyl peroxyneohexanoate, di-t-butyl peroxide, azocyclohexylcarbonitrile, dimethyl $\alpha,\alpha$-azoisobutyrate, succinic acid peroxide, dicumene peroxide, and dichlorobenzoyl peroxide can be used.

As a preferable solvent for use in the preparation of the high-molecular-weight polymer and the low-molecular-weight polymer in the present invention, for example, ethyl acetate, butyl acetate, benzene, toluene, xylene, cyclohexane, and methyl ethyl ketone can be used.

When the high-molecular-weight polymer and the low-molecular-weight polymer of the present invention are synthesized, other monomers copolymerizable with the above components can be used in an amount in the range where they not damage the feature of the present invention, preferably in an amount of 30 wt % or less, and such monomers include $\alpha,\beta$-unsaturated carboxylic acids and their anhydrides, such as acrylic acid, methacrylic acid, crotonic acid, maleic acid, and fumaric acid; monomers having a hydroxyl group, such as hydroxyethyl (meth)acrylate and hydroxypropyl (meth)acrylate; monomers having a glycidyl group, such as glycidyl (meth)acrylate; unsaturated carboxylic acid amides having an amido group, such as (meth)acrylamide, N-methylol (meth)acrylamide, N-butoxymethyl (meth)acrylamide, and diacetone (meth)acrylamide, monomers having an amino group, such as vinylpyridine, dimethylaminoethyl (meth)acrylate, and dimethylaminoethyl (meth)acrylate; and monomers having a phosphoric group, such as acid phosphoxypropyl (meth)acrylate. Such monomers as vinyl acetate (that is excluded in the case of the low-molecular-weight polymer (B)) and (meth)acrylonitrile can also be copolymerized. Further, for example, polyfunctional acrylates, typically triethylene glycol diacrylate and pentaerythritol acrylate, polyfunctional methacrylates, typically ethylene glycol dimethacrylate and trimethylolpropane trimethacrylate, and divinyl benzene can be copolymerized.

Although the actinic-radiation-curing, hot-melt, pressure-sensitive adhesive composition of the present invention can be cured by irradiation with actinic radiation, such as ultraviolet rays and an electron beam, the adhesive composition may contain a photopolymerization initiator, in order to further facilitate the curing. Particularly, if the curing means is ultraviolet rays, a photopolymerization initiator is preferably used, such as a benzoin compound, for example, benzoin, benzoin ethyl ether, benzoin methyl ether, and benzoin isopropyl ether, a carbonyl compound, for example, acetophenone, benzylacetyl, anthraquinone, methylanthraquinone, benzophenone, benzoquinone, and chloroacetone, a sulfur compound, for example, diphenyl sulfide and a dithiolcarbamate, a naphthalene compound, for example, α-chloromethylnaphthalene, anthracene, and a metal salt, for example, iron chloride.

A preferable proportion of the above-mentioned photopolymerization initiator to be mixed is in the range of 0.01 to 20 parts by weight, more preferably 0.1 to 10 parts by weight, per 100 parts by weight of the present composition.

If the curing means is an electron beam or X rays, it is not particularly required to use a photopolymerization initiator.

In order to increase the storage stability of the actinic-radiation-curing, hot-melt, pressure-sensitive adhesive composition of the present invention by preventing it from gelling during storage, and also in order to increase the heat stability of the composition by preventing the composition from being thermally deteriorated or thermally polymerized during heat-coating, preferably a small amount of an antioxidant is used. As preferable antioxidants, for example, phenols, such as hydroquinone, hydroquinone monomethyl ether, catechol, octadecyl-3-(3,5-di-t-butyl-4-hydroxyphenyl)propionate, and pentaerythtyl-tetrakis[3-(3,5-di-t-butyl-4-hydroxyphenyl)propionate], quinones, such as benzoquinone, naphthoquinone, and diphenylbenzoquinone, phosphites, such as tris(nonylphenyl)phosphite and bis(-nonylphenyl)pentaerythritol diphosphite, aromatic amines, such as phenyl-1-naphthylamine, and phenothiazine can be mentioned.

A preferable proportion of these antioxidants to be mixed is in the range of 0.001 to 1 part by weight, per 100 parts by weight of the composition.

Into the actinic-radiation-curing, hot-melt, pressure-sensitive adhesive composition of the present invention, for example, a thermoplastic resin, a tackifier resin, a piasticizer, and a filler can be added in amounts in respective ranges in which the features of the composition are not damaged.

As the tackifier resin, there can be mentioned, for example, rosin and derivertires thereof, such as hydrogenerated rosin, polymerized rosin, (hydrogenated) polymerized rosin, rosin glycerin ester, (hydrogenated) rosin glycerin ester, rosin pentaerythritol ester, (hydrogenated) rosin pentaerythritol ester, disproportionated rosin glycerin ester, and disproportionated rosin pentaerythritol ester; terpene phenol resin, (hydrogenated) terpene phenol resin, ketone resin, petroleum resin (aliphatic based, aromatic based, copolymer based thereof, and aliphatic cyclic based), (hydrogenated) petroleum resin, terpene resin, (hydrogenated) terpene resin, cumarone-indene resin, and xylene resin, with especially preferably rosin and derivatives thereof, terpene phenol resin, (hydrogenated) terpene phenol resin, petroleum resin, (hydrogenated) petroleum resin, and ketone resin being used.

The plasticizer includes representatively, for example, liquid polyisobutene, liquid polybutene, liquid (hydrogenated) polyisoprene, liquid (hydrogenated) polybutadiene, parafinic oil, naphthenic oil, epoxy-type plasticizer, phosphoric esters, phtharic esters, aliphatic dibasic esters, and glycol esters.

As a filler, one or more dried fillers selected from zinc oxide powder, magnesium oxide powder, metal powder, silica powder (including colloidal silica), calcium carbonate powder, titanium oxide powder, talc powder, alumina powder, and carbon black powder. It has been found that employing of especially zinc oxide powder, calcium carbonate powder, titanium oxide powder, talc powder, or carbon black powder is preferred, since the weatherproof property is greatly improved, and heat stability of the system becomes high. However, using more than 30% by weight of filler results in exhibiting high thixotropy in viscosity of the system and lowering of operation ability. Further, the use of more than 30% by weight of filler is not preferred since there is harmful effect such as greatly acceleration of abrasion of hot-melt applicator.

As the reactive diluent, there are polyfunctional monomers and monofunctional monomers. The polyfunctional monomers include poly(meth)acrylates of polyols, such as ethylene glycol diacrylate, diethylene glycol dimethacrylate, and tetraethylene glycol diacrylate, poly(meth)acrylates of epoxy compounds, such as ethylene glycol diglycidyl ether diacrylate, diethylene glycol diglycidyl ether dimethacrylate, triethylene glycol diglycidyl ether dimethacrylate, propylene glycol diglycidyl ether diacrylate, and bisphenol A diglycidyl ether diacrylate, (meth)allyl (meth)acrylates, such as allyl acrylate and allyl methacrylate, (meth)allyl ester of polycarboxylic acids, such as dially maleate, dially fumarate, dially itaconate, dially phthalate, triallyl cyanurate, and triallyl isocyanurate, (meth)acrylates of tertiary amino-alcohols, such as dimethylaminoethyl acrylate, dimethylaminoethyl methacrylate, diethylaminoethyl acrylate, and diethylaminoethyl methacrylate, tertiary aminoalkyl-substituted (meth)acrylamides, such as dimethylaminopropyl acrylamide and dimethylaminopropyl methacrylamide, and diene monomers, such as 1,9-decadiene and 1,13-tetradecadiene. Monofunctional monomers include oxyalkylene monomers, such as ethylene glycol methyl ether acrylate, ethylene glycol n-butyl methyl ether acrylate, ethylene glycol phenol ether acrylate, ethylene glycol nonyl phenol acrylate, and diethylene glycol 2-ethyl hexyl ether acrylate. These monomers in the role of reactive diluents can be used alone or in combination in accordance with the application in order to increase the crosslinking effect in the case of polyfunctional monomers or in order to increase the adhesive performance in the case of monofunctional monomers.

By taking, for example, the odor and volatility into account, out of these polyfunctional monomers, poly(meth)acrylates of polyols are preferably used.

Generally the actinic-radiation-curing, hot-melt, pressure-sensitive adhesive composition of the present invention can be melted by heat in the known manner; it is applied on a variety of substrates in a suitable thickness, and is irradiated with actinic radiation to cure the thus formed layer of the composition to such an extent that the pressure-sensitive adhesion of the layer is not lost, so that a pressure-sensitive adhesive layer can be formed on the substrate. The temperature for the melting is preferably determined for example from the range of 70° to 120° C., and if the temperature for the melting is too high, it is not preferable because the viscosity of the composition is increased suddenly or the composition becomes gelled when the composition is melted by heat.

The above term "actinic radiation" refers to ionizing radiation, such as ultraviolet rays, an electron beam, an $\alpha$ ray, a $\beta$ ray, a ray, or an X ray, and preferably an electron beam is used, for example, because of problems related to apparatuses and because of the ease of handling and because of excellent storage stability and heat stability, as the pressure-sensitive adhesive composition.

The amount of the irradiation of the actinic radiation, for example, in the case of ultraviolet rays, can be adjusted by the exposure dose by adjusting the strength of the lamp, the distance to the surface to be irradiated, and depending on the thickness of the coating and the irradiation time; and the recommended exposure dose is 10 to 1,000 mJ/cm$^2$, preferably 50 to 500 mJ/cm$^2$.

Further, for example, in the case of an electron beam, the exposure dose can be adjusted by adjusting the voltage and the electric current; and the recommended exposure dose is 0.5 to 10 Mrad, preferably 1 to 8 Mrad.

As adhesive articles can be mentioned the following:

Adhesive tapes produced by coating the pressure-sensitive adhesive to one surface of a substrate made, for example, of paper, nonwoven fabric, cloth, plastic film (e.g., olefin film, polyester film, and vinyl chloride film), or metal foil, the other surface of which has been treated with a release agent; and Adhesive sheets, adhesive labels, and adhesive molded articles that are produced by applying the pressure-sensitive adhesive to one surface of a substrate made, for example, of paper, cloth, nonwoven fabric, plastic film, plastic foam, metal film, or molded material (e.g., plastic molded material, metal molded material, inorganic molded material, composite molded material comprising, for example, plasterboard), and by attaching release paper or release film thereto, or by applying the pressure-sensitive adhesive to one surface of release paper or release film and then transferring it to such a substrate; double-side coated adhesive tapes that are produced by applying the pressure-sensitive adhesive composition onto both surfaces of a support made, for example, of rayon paper or nonwoven fabric, and attaching it to double-side release paper or double-side release film or by applying the pressure-sensitive adhesive composition to both surfaces of double-side release paper or double-side release film and transferring it to such a support; and double-side adhesive articles that are one type of noncarrier double-side coated adhesive tape and that are produced by coating the pressure-sensitive adhesive composition to one surface of double-side release paper or double-side release film without using such a support.

As adhesive articles, particularly preferable ones are double-side coated adhesive tapes.

EXAMPLES

The present invention is specifically described below with reference to the following Examples, but the description does not particularly restrict the present invention at all.

The evaluation of the compositions prepared in the Examples and Comparative Examples was carried out as follows. All of the percentages and parts quoted in the Examples are percentages by weight and parts by weight, respectively.

(Change in Melt Viscosity)

The initial melt viscosity and the melt viscosity after 24 hours were measured at 80° C. using a Brookfield rotational viscometer.

(Number-Average Molecular Weight)

The number-average molecular weight was measured, using tetrahydrofuran solvent, by a gel permeation chromatograph (GPC), manufactured by Nippon Bunko-sha, and was expressed in terms of the number-average molecular weight of polystyrene.

(Glass Transition Temperature)(Tg)

The glass transition temperature (Tg) was measured using a differential scanning calorimeter (DSC), manufactured by Seiko Denshi-sha. The heating rate was 10° C./min.

(Preparation of Pressure-Sensitive Adhesive Sheet)

Each actinic-radiation-curing, hot-melt, pressure-sensitive adhesive composition was melted at 80° C. and was applied on a polyethylene terephthalate sheet having a thickness of 25 $\mu$m, by hot-melt coating, so that the thickness of the coating of the pressure-sensitive adhesive composition might be 25 $\mu$m, 40 $\mu$m, or 80 $\mu$m; and the surface of the layer of the composition was irradiated with an electron beam, with the exposure dose being 2 or 4 Mrad, or with ultraviolet rays, with the exposure dose being 200 or 400 mJ/cm$^2$, to cure the layer, to obtain a pressure-sensitive adhesive sheet.

The thus obtained pressure-sensitive adhesive sheets were used to evaluate the performance of the pressure-sensitive adhesive in the following manner.

(180° Peel Strength)

In accordance with JIS Z 0237, the 180° peel strength of the pressure-sensitive adhesive sheet was measured using a stainless steel plate as an adherend, with the peel rate being 300 m/min.

(Retention Force against Shearing Resistance)

The pressure-sensitive adhesive sheet was stuck to a stainless steel plate, with the adhesion area being 25 mm×25 mm; then, in accordance with JIS Z 0237, a load (weight) of 1 kg was hooked in a constant temperature chamber at 40° C., and the time required for the weight to drop was measured.

(Ball Tack)

In accordance with the J. Dow method, the initial adhesion was measured by ball tack, with the angle used in the measurement being 30°, and the temperature used in the measurement being 20° C.

(Drying property)

Each of the actinic-radiation-curing, hot-melt, pressure-sensitive adhesives of the present invention; the solvent-type, acrylic, pressure-sensitive adhesives; and the emulsion-type, acrylic, pressure-sensitive adhesives, was coated onto polyethylene terephthalate films having a thickness of 25 μm, so that the thickness of the respective pressure-sensitive adhesives might be 25 μm, 40 μm, and 80 μm; and then after they were dried for 6 sec in a dryer set at 120° C. (line speed: 100/min; drying step for a length of 10 m), they were immediately taken out, followed by weighing them, and the dried weight of each of the pressure-sensitive adhesives was compared with the weight of adhesive those that had been dried at 120° C. for 2 min and evaluated a dried ratio as shown below. The results are shown in the following Table.

$$\text{Dried ratio (\%)} = \frac{\text{Weight of pressure-sensitive adhesive dried for 2 min}}{\text{Weight of pressure-sensitive adhesive dried for 6 sec}} \times 100$$

| Coating amount (μm) | Drying Property | | |
|---|---|---|---|
| | Reactive-type hot-melt adhesive* | Solvent-type acrylic adhesive** | Emulsion-type acrylic adhesive*** |
| 25 | ○ | ○ | X |
| 40 | ○ | Δ | X |
| 80 | ○ | X | X |

○-the dried ratio was 95% or over.
Δ-the dried ratio was 70% or over but less than 95%.
X-the dried ratio was less than 70%.
Note:
*Composition prepared in Example 18
**MT-TACK 5550S (non-volatile matter: 75%) (manufactured by Mitsui Toatsu Chemicals, Inc.)
**MT-TACK 5387H (non-volatile matter: 62%) (manufactured by Mitsui Toatsu Chemicals, Inc.)

EXAMPLE 1

Ten parts of Kaliflex TR1107 (tradename of SIS, manufactured by Shell Chemical Co.), which is a styrene block copolymer, as a thermoplastic resin (g), was dissolved in 40 parts of toluene, then 70 parts of 2-ethylhexyl acrylate, 20 parts of methyl methacrylate, 0.2 parts of m-isopropenyl-α,α'-dimethylbenzyl isocyanate (manufactured by ACC) as a monomer (c), and 0.5 parts of t-hexyl peroxypivalate as a polymerization initiator were added thereto, and the polymerization was effected for 5 hours at a reaction temperature of 80° C., followed by reaction with 0.11 parts of hydroxyethyl acrylate as a monomer (f) at a temperature of 100° C. for 3 hours, thereby preparing a solution of a high-molecular-weight polymer (AI$_2$). The high-molecular weight polymer had a number-average molecular weight of about 24,000 and a Tg about −45° C. Separately, 20 parts of isobutyl acrylate and 80 parts of ethyl methacrylate in 100 parts of toluene as a solvent to which 10 parts of benzoyl peroxide as a polymerization initiator was added were polymerized at a reaction temperature of 100° C. for 5 hours, thereby preparing a solution of a low-molecular-weight polymer (BI$_2$). The low-molecular-weight polymer had a number-average molecular weight of about 2,400 and a Tg of about 25° C. The above high-molecular-weight polymer solution and the above low-molecular-weight polymer solution were mixed, with the weight ratio of the high-molecular-weight polymer to the low-molecular-weight polymer being 80/20; 0.1 parts of Irganox 1076 (manufactured by Ciba Geigy AG), as a phenol-type antioxidant, was added to 100 parts of this mixed resin, and the toluene was removed, thereby obtaining the desired product (resin composition). The results of the evaluation are shown in Table 1.

EXAMPLE 2

Seventy-eight parts of n-butyl acrylate, 20 parts of a polystyrene having a methacryloyl group at the end (tradename: CHEMLINK 4500, manufactured by SARTOMER Co.; molecular weight: 13,000, Tg: 100° C.), as a macromonomer (da), and 2 parts of 2-methacryloyloxyethyl isocyanate (manufactured by Showa Denko K.K.) were dissolved in 50 parts of ethyl acetate, as a solvent; 0.4 parts of α,α'-azobisisobutyronitrile, as a polymerization initiator, was added thereto, and polymerization was effected at a reaction temperature of 70° C. for 5 hours, followed by reaction with 0.93 parts of acrylic acid, as a monomer (f), at 100° C. for 3 hours, thereby preparing a solution of a high-molecular-weight polymer (AI$_1$). The high-molecular weight polymer had a number-average molecular weight of about 21,000, and the Tg of the alkyl (meth)acrylate moiety thereof was about −51° C.

Separately, 40 parts of n-butyl acrylate, 50 parts of methyl methacrylate, 10 parts of 2-methacryloyloxyethyl isocyanate (manufactured by Showa Denko K.K. ), as a monomer (c), and 5 parts of benzoyl peroxide, as a polymerization initiator, were added into 100 parts of ethyl acetate, as a solvent, and polymerization was effected at a reaction temperature of 100° C. for 5 hours, followed by reaction with 4.6 parts of acrylic acid, as a monomer (f), at a temperature of 100° C. for 3 hours, thereby preparing a solution of a low-molecular-weight polymer (BI$_1$). This low-molecular-weight polymer had a number-average molecular weight of about 5,000 and a Tg of about −5° C. The above high-molecular-weight polymer solution and the above low-molecular-weight polymer solution were mixed, with the weight ratio of the high-molecular-weight polymer to the low-molecular-weight polymer being 70/30; then 0.1 parts of Irganox 1010 (manufactured by Ciba Geigy AG), as a phenol-type antioxidant, was added to 100 parts of this mixed resin, and the ethyl acetate was removed, thereby obtaining the desired product. The results of the evaluation are shown in Table 1.

EXAMPLE 3

Seventy-five parts of 2-ethylhexyl acrylate, 5 parts of methyl methacrylate, 15 parts of (styrene/acrylonitrile) copolymer having a methacryloyl group at the end (tradename of AN-6, manufactured by Toa Goseikagaku K.K.; molecular weight: 6,000, Tg: ca. 80° C.), as a macromonomer (da), 5 parts of acrylic acid, as a monomer (c), and 0.3 part of t-hexyl peroxypivalate, as a polymerization initiator, were dissolved into 40 parts of toluene as a solvent, and polymerization was effected at a reaction temperature of 80° C. for 5 hours, followed by reaction with 2 parts of glycidyl methacrylate, as a monomer (f), at a temperature of 100° C. for 5 hours, thereby preparing a solution of a high-molecular-weight polymer (AI$_1$). This high-molecular-weight polymer had a number-average molecular weight of about 38,000 and a Tg of about −52° C.

Separately, 40 parts of isobutyl acrylate, 50 parts of ethyl methacrylate, 10 parts of acrylic acid, as a monomer (c), and 10 parts of benzoyl peroxide, as a polymerization initiator, were added into 200 parts of toluene, as a solvent, and polymerization was effected at a reaction temperature of 100° C. for 5 hours, followed by reaction with 19 parts of glycidyl methacrylate, as a monomer (f)

at a temperature of 100° C. for 5 hours, thereby preparing a solution of a low-molecular-weight polymer (BI$_1$).

This low-molecular-weight polymer had a number-average molecular weight of about 2,500 and a Tg of about −10° C. The above high-molecular-weight polymer solution and the above low-molecular-weight polymer solution were mixed with the weight ratio of the high-molecular-weight polymer to the low-molecular-weight polymer being 60/40, then 0.1 part of tris(nonylphenyl) phosphite as a phosphite type antioxidant was added thereto, and the toluene was removed, thereby obtaining the desired product. The results of the evaluation are shown in Table 1.

EXAMPLE 4

The solution of the high-molecular-weight polymer (AI$_2$) prepared in Example 1 and the solution of the low-molecular-weight polymer (BI$_1$) prepared in Example 3 were mixed with the weight ratio of the high-molecular-weight polymer to the low-molecular-weight polymer being 60/40, then 0.1 part of hydroquinone as a phenol type antioxidant was added thereto, and the toluene was removed, thereby preparing the desired product. The results of the evaluation are shown in Table 1.

EXAMPLE 5

The solution of the high-molecular-weight polymer (AI$_1$) prepared in Example 3 and the solution of the low-molecular-weight polymer (BI$_2$) prepared in Example 1 were mixed with the weight ratio of the high-molecular-weight polymer to the low-molecular-weight polymer being 70/30, then 0.1 part of hydroquinone as a phenol type antioxidant was added thereto, and the toluene was removed, thereby preparing the desired product. The results of the evaluation are shown in Table 1.

EXAMPLE 6

Ten parts of Kraton G-1652 (SEBS, manufactured by Shell Chemical Co.) that is a styrene block copolymer, as a thermoplastic resin, was dissolved in 40 parts of toluene, then 74 parts of 2-ethylhexyl acrylate, 5 parts of methyl methacrylate, 10 parts of styrene/acrylonitrile-copolymer having a methacryloyl group at the end (tradename of AN-6, manufactured by Toa Goseikagaku K.K.; molecular weight: 6,000, Tg: ca. 80° C.), as a macromonomer (da), 5 parts of hydroxyethyl acrylate, as a monomer (c), and 0.3 part of t-hexyl peroxypivalate, as a polymerization initiator, were added thereto, and polymerization was effected at a reaction temperature of 80° C. for 5 hours, followed by reaction with 5 parts of m-isopropenyl-α,α'-dimethylbenzyl isocyanate (manufactured by ACC Co.) as a monomer (f) at a temperature of 100° C. for 3 hours, thereby preparing a solution of a high-molecular-weight polymer (AI$_1$+AI$_2$). This high-molecular-weight polymer had a number-average molecular weight of about 48,000 and a Tg of about −56° C.

Separately, 20 parts of n-butyl acrylate, 70 parts of methyl methacrylate, 10 parts of m-isopropenyl-α,α'-dimethylbenzyl isocyanate (manufactured by ACC Co.), as a monomer (c), and 10 parts of benzoyl peroxide, as a polymerization initiator, were added into 100 parts of toluene, as a solvent, and polymerization was effected at a reaction temperature of 100° C. for 5 hours, followed by reaction with 6.5 parts of hydroxyethyl methacrylate at a temperature of 100° C. for 3 hours, thereby preparing a solution of a low-molecular-weight polymer (BI$_1$). This low-molecular-weight polymer had a number-average molecular weight of about 3,200 and a Tg of about 25° C. The above high-molecular weight polymer solution and the above low-molecular weight polymer solution were mixed with the weight ratio of the high-molecular weight polymer to the low-molecular weight polymer being 60/40, then 0.1 part of Irganox 1010 (manufactured by Ciba Geigy AG) as a phenol-type antioxidant was added to 100 parts of this mixed resin, and the toluene was removed, thereby obtaining the desired product. The results of the evaluation are shown in Table 1.

EXAMPLE 7

Three parts of benzoyl ethyl ether as a photopolymerization initiator was added to 100 parts of the composition prepared in Example 1, thereby obtaining the desired product. The results of the evaluation are shown in Table 2.

EXAMPLE 8

Three parts of benzoyl isopropyl ether as a photopolymerization initiator was added to 100 parts of the composition prepared in Example 3, thereby obtaining the desired product. The results of the evaluation are shown in Table 2.

COMPARATIVE EXAMPLE 1

A resin composition was prepared in the same manner as in Example 1, except that monomer (f) was not used. The results of evaluation are shown in Table 2.

COMPARATIVE EXAMPLE 2

A resin composition was prepared in the same manner as in° Example 2, except that monomer (c) and monomer (f) were not used. The results of evaluation are shown in Table 2.

COMPARATIVE EXAMPLE 3

A resin composition was prepared in the same manner as in Example 3, except that the low-molecular-weight polymer was not used. The results of evaluation are shown in Table 2.

COMPARATIVE EXAMPLE 4

A resin composition was prepared in the same manner as in Example 3, except that the weight ratio of mixing of the high-molecular-weight polymer to the low-molecular-weight monomer was changed to 30/70. The results of evaluation are shown in Table 2.

TABLE 1

| | Example No. | | | | | |
| --- | --- | --- | --- | --- | --- | --- |
| | 1 | 2 | 3 | 4 | 5 | 6 |
| High-molecular-weight polymer | 80 | 70 | 60 | 60 | 70 | 60 |
| Low-molecular-weight polymer | 20 | 30 | 40 | 40 | 30 | 40 |
| Change in melt viscosity (cps) | | | | | | |
| Temperature (°C.) | 100 | 120 | 100 | 100 | 120 | 120 |

TABLE 1-continued

|  | Example No. | | | | | |
| --- | --- | --- | --- | --- | --- | --- |
|  | 1 | 2 | 3 | 4 | 5 | 6 |
| Initial viscosity | 49,000 | 39,000 | 35,000 | 28,000 | 48,000 | 52,000 |
| Viscosity after 24 hours | 53,000 | 50,000 | 42,000 | 32,000 | 60,000 | 67,000 |
| Coating amount (μm) | 25 | 25 | 25 | 25 | 25 | 25 |
| 180° Peel strength (kg/inch) | 1.1 | 1.2 | 1.3 | 1.3 | 1.2 | 1.2 |
| Ball tack | 9 | 5 | 4 | 5 | 7 | 8 |
| Retention force at 40° C.* | 24 < | 24 < | 24 < | 24 < | 24 < | 24 < |
| Means of curing | electron beam | electron beam | electron beam | electron beam | electron beam | electron beam |
| Exposure dose (Mrad) | 4 | 4 | 4 | 4 | 4 | 4 |

Note: *in terms of hours

TABLE 2

|  | Example No. | | Comparative example No. | | | |
| --- | --- | --- | --- | --- | --- | --- |
|  | 7 | 8 | 1 | 2 | 3 | 4 |
| High-molecular-weight polymer | 80 | 60 | 80*1) | 70*2) | 100 | 30 |
| Low-molecular-weight polymer | 20 | 40 | 20 | 30 | 0 | 70 |
| Change in melt viscosity (cps) | | | | | | |
| Temperature (°C.) | 100 | 100 | 100 | 120 | 150 | 100 |
| Initial viscosity | 49,000 | 35,000 | 48,000 | 35,000 | 41,000 | 5,000 |
| Viscosity after 24 hours | 75,000 | 58,000 | 52,000 | 40,000 | gelation | 7,000 |
| Coating amount (μm) | 25 | 25 | 25 | 25 | 25 | 25 |
| 180° Peel strength (kg/inch) | 1.1 | 1.2 | 0.5 | 0.3 | 0.2 | 0.2 |
| Ball tack | 10 | 5 | 8 | 5 | 2 > | 3 |
| Retention force at 40° C.* | 24 < | 24 < | 1 > | 1 > | 2 | 3 |
| Means of curing | UV-rays | UV-rays | electron beam | electron beam | electron beam | electron beam |
| Exposure dose (Mrad) | — | — | 4 | 4 | 4 | 4 |
| Exposure dose (mJ/cm$^2$) | 200 | 200 | — | — | — | — |

Note:
*in terms of hours
*1)High-molecular-weight polymer not used monomer (f)
*2)High-molecular-weight polymer not used monomers (c) and (f)

(Reference Examples for the Preparation of Reactive Polymers)

REFERENCE EXAMPLE 1)

Three hundred parts of methyl methacrylate, 1.5 parts of m-isopropenyl-α,α'-dimethylbenzyl isocyanate (manufactured by ACC Co.) as a monomer (c) in 207 parts of toluene as a solvent to which 6 parts of benzoyl peroxide had been added were polymerized at a reaction temperature of 90° C. for 5 hours; and then 0.9 parts of 2-hydroxyethyl acrylate, as a monomer (f), was added to react with the obtained polymer at a reaction temperature of 90° C. for 4 hours, thereby obtaining a solution of a reactive polymer (d-1). The reactive polymer (d-1) had a number-average molecular-weight of about 11,000 and a Tg of about 100° C.

REFERENCE EXAMPLE 2)

One hundred fifty parts of styrene, 150 parts of n-butyl acrylate, and 1.5 parts of m-isopropenyl-α,α-dimethylbenzyl isocyanate (manufactured by ACC Co.) as a monomer (c) in 207 parts of toluene as a solvent to which parts of benzoyl peroxide as a polymerization initiator had been added were polymerized at a reaction temperature of 90° C. for 5 hours and then 0.9 part of 2-hydroxyethyl acrylate as a monomer (f) was added to react with the obtained polymer at a reaction temperature of 90° C. for 4 hours, thereby obtaining a solution of a reactive polymer (d-2). The reactive polymer (d-2) had a number-average molecular-weight of about 10,000 and a Tg of about 52° C.

(Reference Examples for the Preparation of High-molecular-weight Polymers)

REFERENCE EXAMPLE 3)

Ninety parts of n-butyl acrylate, 1.0 part of m-isopropenyl-α,α'-dimethylbenzyl isocyanate (manufactured by ACC Co.) as a monomer (c), and 15.6 parts of the reactive polymer (d-1) prepared in the Reference Example 1 were added in 50 parts of toluene as a solvent, and 0.2 parts of t-hexyl peroxypyvalate as a polymerization initiator was added, followed by reacting them at a reaction temperature of 100° C. for 5 hours. Then 0.4 parts of 2-hydroxyethyl acrylate as a monomer (f) was added to react at a temperature of 90° C. for 3 hours, thereby obtaining a solution of a high-molecular-weight polymer (AII-1). This high-molecular-weight polymer (AII-1) had a number-average molecular-weight of about 24,000 and a Tg of about −44° C.

(REFERENCE EXAMPLE 4)

Ninety parts of n-butyl acrylate, 0.3 part of mathacrylic acid, as a monomer (c), and 15.6 parts of the reactive polymer (d-2) prepared in the Reference Example 2 were added in 50 parts of toluene as a solvent, and 0.2 parts of t-hexyl peroxypyvalate as a polymerization initiator was added, followed by reacting them at a reaction temperature of 100° C. for 5 hours. Then 0.5 parts of glycidyl methacrylate as a monomer (f) was added to react at a temperature of 100° C. for 3 hours, thereby obtaining a solution of a high-molecular-weight polymer (AII-2). This high-molecular-weight polymer (AII-2) had a number-average molecular-weight of about 23,000 and a Tg of about −49° C.

(REFERENCE EXAMPLE 5)

One hundred parts of n-butyl acrylate, 1.0 part of m-isopropenyl-α,α'-dimethylbenzyl isocyanate (manufactured by ACC Co.) as a monomer (c), and 0.2 parts of t-hexyl peroxypyvalate as a polymerization initiator were added into 50 parts of toluene as a solvent, and the reaction was effected at a reaction temperature of 100° C. for 5 hours. Then 0.6 parts of 2-hydroxyethyl acrylate as a monomer (f) was added to react at a temperature of 100° C. for 3 hours, thereby obtaining a solution of a high-molecular-weight polymer (AII-3). This high-molecular-weight polymer (AII-3) had a number-average molecular-weight of about 24,000 and a Tg of about −53° C.

(Reference Examples for the Preparation of Low-molecular-weight Polymers)

REFERENCE EXAMPLE 6)

Forty parts of n-butyl acrylate, 50 parts of methyl methacrylate, 10 parts of 2-methacryloyloxyethyl isocyanate (manufactured by Showa Denko K.K.) as a monomer (c), and 0.2 parts of benzoyl peroxide as a polymerization initiator were added into 100 parts of ethyl acetate as a solvent, and the polymerization was effected at a reaction temperature of 100° C. for 5 hours, followed by reaction with 4.6 parts of acrylic acid as a monomer (f) at a temperature of 100° C. for 3 hours, thereby obtaining a solution of a low-molecular-weight polymer ($BII_1$-1). This low-molecular-weight polymer (BIII-1) had a number-average molecular-weight of about 5,000 and a Tg of about −5° C.

REFERENCE EXAMPLE 7)

Twenty parts of isobutyl acrylate, 75 parts of ethyl methacrylate, 5 parts of vinyl acetate, and 10 parts of benzoyl peroxide as a polymerization initiator were added into 100 parts of toluene as a solvent, and the polymerization was effected at a reaction temperature of 100° C. for 5 hours, thereby obtaining a solution of a low-molecular-weight polymer ($BII_2$-1). This low-molecular-weight polymer ($BII_2$-1) had a number-average molecular-weight of about 2,400 and a Tg of about 25° C.

REFERENCE EXAMPLE 8)

One thousand parts of cyclohexane purified by distillation, .64 parts of n-butyl acrylate, 50 parts of methyl methacrylate, and 10 parts of cyclohexane solution of 2.0 mol per liter of sec-butyl lithium were introduced into a flask, and the polymerization was effected under an atmosphere of nitrogen and at a temperature of 50° C. After polymerization, ethylene oxide gas was introduced to substantially react with poly(t-butylstyryl)lithium. Then 3.0 parts of acryloyl chloride was added, to prepare a solution Of a low-molecular-weight polymer ($BII_3$-1). This low-molecular-weight polymer ($BII_3$-1) had a number-average molecular-weight of about 6,000 and a Tg of about 25° C.

REFERENCE EXAMPLE 9)

Five hundred parts of toluene, 500 parts of n-butylacrylate, and 20 parts of thioglycolic acid were introduced into a flask and heated at a temperature of 80° C. under an atmosphere of nitrogen. Thirty parts of 4,4'-azobis-4-cyanovaleric acid in 85 parts of toluene was added dropwise into the flask over 2 hours. Further, heating was continued for more 1 hour, to finish the polymerization.

Further, 20 parts of glycidyl methacrylate and 2 parts of triethylamine were added, and the reaction was effected at a temperature of 90° C. for 5 hours, thereby preparing a solution of a low-molecular-weight polymer ($BII_3$-2). The low-molecular-weight polymer ($BII_3$-2) had a number-average molecular-weight of about 6,000 and a Tg of about −50° C.

EXAMPLE 9

The high-molecular-weight polymer (AII-1) solution obtained in Reference Example 3 and the low-molecular-weight polymer ($BII_1$-1) solution obtained in Reference Example 6 were mixed with the weight ratio of (AII-1)/($BII_1$-1) being 70/30, and 0.1 parts of tris(-nonylphenyl)phosphite as a phosphite-type antioxidant was added to 100 parts of this mixture of polymers, and the solvent was removed, thereby obtaining the desired product. The results of the evaluation are shown in Table 3.

EXAMPLE 10

The high-molecular-weight polymer (AII-1) solution obtained in Reference Example 3 and the low-molecular-weight polymer ($BII_2$-1) solution obtained in Reference Example 7 were mixed with the weight ratio of (AII-1)/($BII_2$-1) being 50/50, and 0.1 parts of Irganox 1010 (manufactured by Ciba Geigy AG) as a hindered phenol-type antioxidant was added to 100 parts by weight of this mixture of polymers, and the solvent was removed, thereby obtaining the desired product. The results of the evaluation are shown in Table 3.

EXAMPLE 11

The high-molecular-weight polymer (AII-1) solution obtained in Reference Example 3 and the low-molecular-weight polymer ($BII_3$-1) solution obtained in Reference Example 8 were mixed with the weight ratio of (AII-1)/($BII_3$-1) being 30/70, and 0.1 parts of tris(-nonylphenyl)phosphite as a phosphite-type antioxidant was added to 100 parts by weight of this mixture of polymers, and the solvent was removed, thereby obtaining the desired product. The results of the evaluation are shown in Table 3.

EXAMPLE 12

The high-molecular-weight polymer (AII-2) solution obtained in Reference Example 4 and the low-molecular-weight polymer ($BII_1$-1) solution obtained in Reference Example 6 were mixed with the weight ratio of (AII-2)/($BII_1$-1) being 70/30, and 0.1 parts of tris(-nonylphenyl)phosphite as a phosphite-type antioxidant was added to 100 parts by weight of this mixture of polymers, and the solvent was removed, thereby obtaining the desired product. The results of the evaluation are shown in Table 3.

EXAMPLE 13

The high-molecular-weight polymer (AII-2) solution obtained in Reference Example 4 and the low-molecular-weight polymer ($BII_2$-1) solution obtained in Reference Example 7 were mixed with the weight ratio of (AII-1)/($BII_2$-1) being 50/50, and 0.1 parts of tris(-nonylphenyl)phosphite as a phosphite-type antioxidant was added to 100 parts by weight of this mixture of polymers, and the solvent was removed, thereby obtaining the desired product. The results of the evaluation are shown in Table 3.

EXAMPLE 14

The high-molecular-weight polymer (AII-2) solution obtained in Reference Example 2 and the low-molecular-weight polymer (BII$_3$-2) solution obtained in Reference Example 7 were mixed with the weight ratio of (AII-2)/(BII$_3$-2) being 30/70, and 0.1 parts of Irganox 1010 (manufactured by Ciba Geigy AG) as a hindered phenol-type antioxidant was added to 100 parts by weight of this mixture of polymers, and the solvent was removed, thereby obtaining the desired product. The results of the evaluation are shown in Table 3.

EXAMPLE 15

A desired product was obtained by adding 3 parts of benzoin ethylether as a photopolymerization initiator to 100 parts of composition prepared in Example 9. The desired product was evaluated as a product for curing by ultraviolet-rays. The results of the evaluation are shown in Table 4.

EXAMPLE 16

A desired product was obtained by adding 3 parts of benzoin isopropylether as a photopolymerization initiator to 100 parts of composition prepared in Example 11. The desired product was evaluated as a product for curing by ultraviolet-rays. The results of the evaluation are shown in Table 4.

EXAMPLE 17

A desired product was obtained by adding 3 parts of benzoin isopropylether as a photopolymerization initiator to 100 parts of composition prepared in Example 13. The desired product was evaluated as a product for curing by ultraviolet-rays. The results of the evaluation are shown in Table 4.

COMPARATIVE EXAMPLE 5

The high-molecular-weight polymer (AII-3) solution obtained in Reference Example 5 and the low-molecular-weight polymer (BII$_1$-1) solution obtained in Reference Example 6 were mixed with the weight ratio of (AII-3)/(BII$_1$-1) being 70/30, and 0.1 parts of tris(-nonylphenyl)phosphite as a phosphite-type antioxidant was added to 100 parts by weight of this mixture of polymers, and the solvent was removed, thereby obtaining the desired product. The results of the evaluation are shown in Table 5.

COMPARATIVE EXAMPLE 6

The high-molecular-weight polymer (AII-3) solution obtained in Reference Example 5 and the low-molecular-weight polymer (BIII-1) solution obtained in Reference Example 7 were mixed with the weight ratio of (AII-3)/(BII$_3$-1) being 50/50, and 0.1 parts of tris(-nonylphenyl)phosphite as a phosphite-type antioxidant was added to 100 parts by weight of this mixture of polymers, and the solvent was removed, thereby obtaining the desired product. The results of the evaluation are shown in Table 5.

COMPARATIVE EXAMPLE 7

The high-molecular-weight polymer (AII-3) solution obtained in Reference Example 5 and the low-molecular-weight polymer (BII$_3$-2) solution obtained in Reference Example 9 were mixed with the weight ratio of (AII-3)/(BII$_3$-2) being 30/70, and 0.1 parts of tris(-nonylphenyl)phosphite as a phosphite-type antioxidant was added to 100 parts by weight of this mixture of polymers, and the solvent was removed, thereby obtaining the desired product. The results of the evaluation are shown in Table 5.

COMPARATIVE EXAMPLE 8

To the high-molecular-weight polymer (AII-1) solution obtained in Reference Example 3, 0.1 parts of Irganox 1010 (manufactured by Ciba Geigy AG) as a phenol-type antioxidant was added to 100 parts by weight of polymer, and the solvent was removed, thereby obtaining the desired product. The results of the evaluation are shown in Table 5.

COMPARATIVE EXAMPLE 9

To 100 parts of the composition prepared in the Comparative Example 5, 3 parts of benzoyl isopropyl ether, as a photopolymerization initiator, thereby obtaining the desired product. The desired product was evaluated as a product for curing by ultraviolet-rays. The results of the evaluation are shown in Table 5.

COMPARATIVE EXAMPLE 10

To the high-molecular-weight polymer (AII-3) solution obtained in Reference Example 5, 0.1 parts of tris(-nonylphenyl) as a phenol-type antioxidant was added to 100 weight parts of polymer, and 3 parts of benzoin propyl ether, as a photopolymerization initiator, was added, thereby obtaining the desired product. The desired product was evaluated as a product for curing by ultraviolet-rays. The results of the evaluation are shown in Table 5.

TABLE 3

|  | Example No. | | | | | |
| --- | --- | --- | --- | --- | --- | --- |
|  | 9 | 10 | 11 | 12 | 13 | 14 |
| High-molecular-weight polymer | | | | | | |
| AII-1 | 70 | 50 | 30 | — | — | — |
| AII-2 | — | — | — | 70 | 50 | 30 |
| AII-3 | — | — | — | — | — | — |
| Low-molecular-weight polymer | | | | | | |
| BII$_1$-1 | 30 | — | — | 30 | — | — |
| BII$_2$-1 | — | 50 | — | — | 50 | — |
| BII$_3$-1 | — | — | 70 | — | — | — |
| BII$_3$-2 | — | — | — | — | — | 70 |
| Change in melt viscosity (cps) | | | | | | |
| Temperature (°C.) | 100 | 100 | 100 | 100 | 100 | 100 |
| Initial viscosity | 42,000 | 35,000 | 30,000 | 41,000 | 34,000 | 31,000 |
| Viscosity after 24 hours | 47,000 | 38,000 | 32,000 | 47,000 | 37,000 | 33,000 |
| Coating amount (μm) | 25 | 25 | 25 | 25 | 25 | 25 |

TABLE 3-continued

|  | Example No. | | | | | |
| --- | --- | --- | --- | --- | --- | --- |
|  | 9 | 10 | 11 | 12 | 13 | 14 |
| 180° Peel strength (kg/inch) | 1.1 | 1.2 | 1.3 | 1.3 | 1.2 | 1.2 |
| Ball tack | 8 | 5 | 6 | 6 | 7 | 13 |
| Retention force at 40° C.* | 24 < | 24 < | 24 < | 24 < | 24 < | 24 < |
| Means of curing | electron beam | electron beam | electron beam | electron beam | electron beam | electron beam |
| Exposure dose (Mrad) | 4 | 4 | 4 | 4 | 4 | 4 |

Note: *in terms of hours

TABLE 4

|  | Example No. | | |
| --- | --- | --- | --- |
|  | 15 | 16 | 17 |
| High-molecular-weight polymer | | | |
| AII-1 | 70 | 30 | — |
| AII-2 | — | — | 50 |
| AII-3 | — | — | — |
| Low-molecular-weight polymer | | | |
| BII$_1$-1 | 30 | — | — |
| BII$_2$-1 | — | — | 50 |
| BII$_3$-1 | — | 70 | — |
| BII$_3$-2 | — | — | — |
| Change in melt viscosity (cps) | | | |
| Temperature (°C.) | 100 | 100 | 100 |
| Initial viscosity | 39,000 | 27,000 | 30,000 |
| Viscosity after 24 hours | 44,000 | 30,000 | 32,000 |
| Coating amount (μm) | 25 | 25 | 25 |
| 180° Peel strength (kg/inch) | 1.0 | 1.2 | 1.1 |
| Ball tack | 9 | 7 | 6 |
| Retention force at 40° C.* | 24 < | 24 < | 24 < |
| Means of curing | UV-rays | UV-rays | UV-rays |
| Exposure dose (mJ/cm²) | 200 | 200 | 200 |

Note: *in terms of hours

TABLE 5

|  | Comparative example No. | | | | | |
| --- | --- | --- | --- | --- | --- | --- |
|  | 5 | 6 | 7 | 8 | 9 | 10 |
| High-molecular-weight polymer | | | | | | |
| AII-1 | — | — | — | 100 | — | — |
| AII-2 | — | — | — | — | — | — |
| AII-3 | 70 | 50 | 30 | — | 70 | 100 |
| Low-molecular-weight polymer | | | | | | |
| BII$_1$-1 | 30 | — | — | — | 30 | — |
| BII$_2$-1 | — | 50 | — | — | — | — |
| BII$_3$-1 | — | — | — | — | — | — |
| BII$_3$-2 | — | — | 70 | — | — | — |
| Change in melt viscosity (cps) | | | | | | |
| Temperature (°C.) | 100 | 100 | 100 | 150 | 100 | 150 |
| Initial viscosity | 43,000 | 34,000 | 27,000 | 58,000 | 37,000 | 56,000 |
| Viscosity after 24 hours | 47,000 | 36,000 | 30,000 | gelation | gelation | gelation |
| Coating amount (μm) | 25 | 25 | 25 | 25 | 25 | 25 |
| 180° Peel strength (kg/inch) | 0.3 | 0.4 | 0.4 | 0.5 | 0.3 | 0.4 |
| Ball tack | 8 | 6 | 16 | 8 | 7 | 7 |
| Retention force at 40° C.* | 0.3 | 0.4 | 0.2 | 24 < | 0.2 | 3 |
| Means of curing | electron beam | electron beam | electron beam | electron beam | UV-rays | UV-rays |
| Exposure dose (Mrad) | 4 | 4 | 4 | 4 | — | — |
| Exposure dose (mJ/cm²) | — | — | — | — | 200 | 200 |

Note: * in terms of hours (Reference Examples for the Preparation of Low-Molecular-Weight Polymer)

(REFERENCE EXAMPLE 10)

Eighty parts of styrene, 20 parts of glycidyl methacrylate, as a monomer (c), and 10 parts of t-butyl-peroxy-2-ethylheaxanoate, as a polymerization initiator, were added to 100 parts of xylene, as a solvent, followed by reacting them at a reaction temperature of 140° C. for 5 hours, thereby obtaining a solution of a low-molecular-weight polymer base (BIII-1). This low-molecular-weight polymer base (BIII-1) had a number-average molecular-weight of about 3,000 and a Tg of about 43° C.

(REFERENCE EXAMPLE 11)

Forty parts of methyl methacrylate, 40 parts of n-butyl acrylate, 20 parts of glycidyl methacrylate, as a monomer (c), and 10 parts of t-butyl-peroxy-2-ethyl-heaxanoate, as a polymerization initiator, were added to 100 parts of xylene, as a solvent, followed by reacting them at a reaction temperature of 140° C. for 5 hours, thereby obtaining a solution of a low-molecular-weight polymer base (BIII-2). This low-molecular-weight polymer base (BIII-2) had a number-average molecular-weight of about 2,500 and a Tg of about −5° C.

REFERENCE EXAMPLE 12)

Seventy parts of styrene, 30 parts of hydroxyethyl acrylate, as a monomer (c), and 10 parts of t-butyl-peroxy-2-ethylheaxanoate, as a polymerization initiator, were added to 100 parts of xylene, as a solvent, followed by reacting them at a reaction temperature of 140° C. for 5 hours, thereby obtaining a solution of a low-molecular-weight polymer base (BIII-3). This low-molecular-weight polymer base (BIII-3) had a number-average molecular-weight of about 3,200 and a Tg of about 48° C.

REFERENCE EXAMPLE 13)

94.5 Parts of styrene, 5.0 parts of hydroxyethyl acrylate, as a monomer (c), 0.5 parts of glycidyl methacrylate, and 5 parts of t-butyl-peroxy-2-ethylheaxanoate, as a polymerization initiator, were added to 100 parts of xylene, as a solvent, followed by reacting them at a reaction temperature of 140° C. for 5 hours, thereby obtaining a solution of a low-molecular-weight polymer base (BIII-4). This low-molecular-weight polymer base (BIII-4) had a number-average molecular-weight of about 4,000 and a Tg of about 65° C.

(Reference Examples for the Preparation of High-molecular-weight Polymer Main Chain)

REFERENCE EXAMPLE 14)

One hundred parts of n-butyl acrylate, 0.4 parts of acrylic acid, as a monomer (f), and 0.2 parts of t-butyl-peroxy-2-ethylheaxanoate, as a polymerization initiator, were added to 50 parts of toluene, as a solvent, followed by reacting them at a reaction temperature of 100° C. for 5 hours, thereby obtaining a solution of a high-molecular-weight polymer main chain (AIII$_2$-1). This high-molecular-weight polymer main chain (AIII$_2$-1) had a number-average molecular-weight of about 30,000 and a Tg of about −42° C.

REFERENCE EXAMPLE 15)

Fifty parts of 2-ethylhexyl acrylate, 50 parts of n-butyl acrylate, 0.7 parts of 2-methacryloyloxyethyl isocyanate (manufactured by Showa Denko K.K.), as a monomer (f), and 0.2 parts of t-butyl-peroxy-2-ethylheaxanoate, as a polymerization initiator, were added to 50 parts of toluene, as a solvent, followed by reacting them at a reaction temperature of 100° C. for 5 hours, thereby obtaining a solution of a high-molecular-weight polymer main chain (AIII$_2$-2). This high-molecular-weight polymer main chain (AIII$_2$-2) had a number-average molecular-weight of about 60,000 and a Tg of about −51° C.

REFERENCE EXAMPLE 16)

Forty parts of n-butyl acrylate, 60 parts of methyl methacrylate, 0.1 parts of acrylic acid, as a monomer (f), and 0.147 parts of mercaptopropionic acid, 1.6 parts of 2,2-azobis(2,4-dimethyl valeronitrile, as a polymerization initiator, were added to 50 parts of toluene, as a solvent, followed by reacting them at a reaction temperature of 100° C. for 5 hours, thereby obtaining a solution of a high-molecular-weight polymer main chain (AIII$_1$-3). This high-molecular-weight polymer main chain (AIII$_1$-3) had a number-average molecular-weight of about 49,000 and a Tg of about −9° C.

REFERENCE EXAMPLE 17)

Forty parts of 2-ethylhexyl acrylate, 60 parts of methyl methacrylate, 1.0 part of acrylic acid, as a monomer (f), and 0.15 parts of t-butyl-peroxy-2-ethylheaxanoate, as a polymerization initiator, were added to 50 parts of toluene, as a solvent, followed by reacting them at a reaction temperature of 100° C. for 5 hours, thereby obtaining a solution of a high-molecular-weight polymer main chain (AIII$_2$-2). This high-molecular-weight polymer main chain (AIII$_2$-2) had a number-average molecular-weight of about 51,000 and a Tg of about −12° C.

(Reference Examples for the Preparation of High-Molecular-Weight Polymer and Low-Molecular-weight)

REFERENCE EXAMPLE 18)

The low-molecular-weight polymer base (BIII-1) solution obtained in Reference Example 10 and the high-molecular-weight polymer (AIII$_2$-1) solution obtained in Reference Example 14 were mixed with the weight ratio of (BIII-1)/(AIII$_2$-1) being 20/80, and 0.5 parts of t-butylammoniumbromide, as a catalyst, to 100 parts of polymer, were added, followed by reacting at 100° C. for 4 hours, and then 1.5 parts of acrylic acid, as a monomer (f) was added, followed by reacting further at 100° C. for 4 hours, thereby obtaining the mixed solution (AB-1) of high-molecular-weight polymer/Low-molecular-weight polymer.

REFERENCE EXAMPLE 19)

The low-molecular-weight polymer base (BIII-1 and BIII-2) solutions obtained in Reference Examples 10 and 11 and the high-molecular-weight polymer (AIII$_2$-1) solution obtained in Reference Example 14 were mixed with the weight ratio of (BIII-1)/(BIII-2)/(AIII$_2$-1) being 10/20/70, and 0.5 parts of t-butylammoniumbromide, as a catalyst, for 100 parts of polymer, were added, followed by reacting at 100° C. for 4 hours, and then 2.1 parts of acrylic acid, as a monomer (f) was added, followed by reacting further at 100° C. for 4 hours, thereby obtaining the mixed solution (AB-2) of high-molecular-weight polymer/Low-molecular-weight polymer.

REFERENCE EXAMPLE 20)

The low-molecular-weight polymer base (BIII-3) solution obtained in Reference Example 12 and the high-molecular-weight polymer (AIII$_2$-2) solution obtained in Reference Example 15 were mixed with the weight ratio of (BIII-1)/(AIII$_2$-1) being 40/60, and 1.0 part of triethylamine of 100 parts of polymer, were added, followed by reacting at 100° C. for 4 hours, and then 4.0 parts of methacryloyloxyethyl isocyanate, as a monomer (f) was added, followed by reacting further at 100° C. for 4 hours, thereby obtaining the mixed solution (AB-3) of high-molecular-weight polymer/Low-molecular-weight polymer.

REFERENCE EXAMPLE 21)

The low-molecular-weight polymer base (BIII-2) solution obtained in Reference Example 11 and the high-molecular-weight polymer (AIII$_1$-3) solution obtained in Reference Example 16 were mixed with the weight ratio of (BIII-2)/(AIII$_1$-3) being 20/80, and 0.5 parts of tbutylammoniumbromide, for 100 parts of polymer, were added, followed by reacting at 100° C. for 4 hours, and then 2.1 parts of acrylic acid, as a monomer (f) was added, followed by reacting further at 100° C. for 4 hours, thereby obtaining the mixed solution (AB-4) of High-molecular-weight polymer/Low-molecular-weight polymer.

REFERENCE EXAMPLE 22)

The low-molecular-weight polymer base (BIII-4) solution obtained in Reference Example 13 and the high-molecular-weight polymer (AIII$_2$-1) solution obtained in Reference Example 14 were mixed with the weight ratio of (BIII-4)/(AIII$_2$-1) being 20/80, and 0.5 parts of t-butylammoniumbromide, for 100 parts of polymer, were added, followed by reacting at 100° C. for 4 hours, and then 2.1 parts of acrylic acid, as a monomer (f) was added, followed by reacting further at 100° C. for 4 hours, thereby obtaining the mixed solution (AB-5) of high-molecular-weight polymer/low-molecular-weight polymer.

REFERENCE EXAMPLE 23)

The low-molecular-weight polymer base (BIII-1) solution obtained in Reference Example 10 and the high-molecular-weight polymer (AIII$_2$-4) solution obtained in Reference Example 17 were mixed with the weight ratio of (BIII-4)/(AIII$_2$-1) being 30/70, and 0.5 parts of tbutylammoniumbromide, for 100 parts of polymer, were added, followed by reacting at 100° C. for 4 hours, and then 2.1 parts of acrylic acid, as a monomer (f) was added, followed by reacting further at 100° C. for 4 hours, thereby obtaining the mixed solution (AB-6) of high-molecular-weight polymer/low-molecular-weight polymer.

EXAMPLE 18

To the mixed solution of high-molecular-weight polymer/low-molecular-weight (AB-1) obtained in Reference Example 18, 0.1 parts of tris(nonylphenyl)-phosphite as a phosphite-type antioxidant was added to 100 parts of this mixed polymers, and the solvent was removed, thereby obtaining the desired product. The results of the evaluation are shown in Table 6.

EXAMPLE 19

To the mixed solution of high-molecular-weight polymer/low-molecular-weight (AB-2) obtained in Reference Example 19, 0.1 parts of tris(nonylphenyl)-phosphite as a phosphite-type antioxidant was added to 100 parts of this mixed polymers, and the solvent was removed, thereby obtaining the desired product. The results of the evaluation are shown in Table 6.

EXAMPLE 20

To the mixed solution of high-molecular-weight polymer/low-molecular-weight (AB-3) obtained in Reference Example 20, 0.1 parts of tris(nonylphenyl)-phosphite as a phosphite-type antioxidant was added to 100 parts of this mixed polymers, and the solvent was removed, thereby obtaining the desired product. The results of the evaluation are shown in Table 7.

EXAMPLE 21

To the mixed solution of high-molecular-weight polymer/low-molecular-weight (AB-4) obtained in Reference Example 21, 0.1 parts of Irganox 1010, as a hindered phenol-type antioxidant was added to 100 parts of this mixed polymers, and the solvent was removed, thereby obtaining the desired product. The results of the evaluation are shown in Table 7.

EXAMPLE 22

To 100 parts the composition prepared in Example 18, 0.3 parts of benzoyl propylether, as a photopolymerization initiator, was added, thereby obtaining the desired product. The results of the evaluation are shown in Table 8.

EXAMPLE 23

To 100 parts the composition prepared in Example 18, 20 parts of diethyleneglycol dimethacrylate, as a reaction diluent, was added, thereby obtaining the desired product. The results of the evaluation are shown in Table 8.

COMPARATIVE EXAMPLE 11

To the mixed solution of high-molecular-weight polymer/low-molecular-weight (AB-5) obtained in Reference Example 22, 0.1 parts of tris(nonylphenyl)-phosphate, as a phosphite-type antioxidant was added to 100 parts of this mixed polymers, and the solvent was removed, thereby obtaining the desired product. The results of the evaluation are shown in Table 9.

COMPARATIVE EXAMPLE 12

To the mixed solution of high-molecular-weight polymer/low-molecular-weight (AB-6) obtained in Reference Example 23, 0.1 parts of tris(nonylphenyl)-phosphate, as a phosphite-type antioxidant was added to 100 parts of this mixed polymers, and the solvent was removed, thereby obtaining the desired product. The results of the evaluation are shown in Table 9.

TABLE 6

| | Example No. | | | | | |
|---|---|---|---|---|---|---|
| | 18 | | | 19 | | |
| Change in melt viscosity (cps) | | | | | | |
| Temperature (°C.) | 80 | | | 80 | | |
| Initial viscosity | 32,000 | | | 25,000 | | |
| Viscosity after 24 hours | 36,000 | | | 31,000 | | |
| Coating amount (μm) | 25 | 40 | 80 | 25 | 40 | 80 |
| 180° Peel strength (kg/inch) | 0.7 | 0.9 | 1.1 | 1.1 | 1.3 | 1.5 |
| Ball tack | 6 | 8 | 9 | 8 | 10 | 11 |
| Retention force at 40° C.* | 24 < | 24 < | 24 < | 24 < | 24 < | 24 < |
| Means of curing | electron beam | electron beam | electron beam | electron beam | electron beam | electron beam |
| Exposure dose (Mrad) | 2 | 2 | 4 | 2 | 2 | 4 |

Note: *in terms of hours

TABLE 7

| | Example No. | | | | | |
|---|---|---|---|---|---|---|
| | 20 | | | 21 | | |
| Change in melt viscosity (cps) | | | | | | |
| Temperature (°C.) | | 80 | 80 | | | 80 |
| Initial viscosity | | 24,000 | | | 26,000 | |
| Viscosity after 24 hours | | 30,000 | | | 32,000 | |
| Coating amount (μm) | 25 | 40 | 80 | 25 | 40 | 80 |
| 180° Peel strength (kg/inch) | 1.1 | 1.1 | 1.3 | 0.9 | 1.0 | 1.1 |
| Ball tack | 9 | 10 | 12 | 8 | 9 | 10 |
| Retention force at 40° C.* | 24 < | 24 < | 24 < | 24 < | 24 < | 24 < |
| Means of curing | electron | electron | electron | electron | electron | electron |

TABLE 7-continued

| | Example No. | | | | | |
|---|---|---|---|---|---|---|
| | 20 | | | | 21 | |
| Exposure dose (Mrad) | beam 2 | beam 2 | beam 4 | beam 2 | beam 2 | beam 4 |

Note:
*in terms of hours

TABLE 8

| | Example No. | | | | | |
|---|---|---|---|---|---|---|
| | 22 | | | 23 | | |
| Change in melt viscosity (cps) | | | | | | |
| Temperature (°C.) | | 80 | 80 | | | 80 |
| Initial viscosity | | 32,000 | | | 21,000 | |
| Viscosity after 24 hours | | 38,000 | | | 26,000 | |
| Coating amount (μm) | 25 | 40 | 80 | 25 | 40 | 80 |
| 180° Peel strength (kg/inch) | 0.8 | 0.9 | 1.1 | 0.9 | 1.0 | 1.1 |
| Ball tack | 7 | 8 | 10 | 6 | 8 | 9 |
| Retention force at 40° C.* | 24 < | 24 < | 24 < | 24 < | 24 < | 24 < |
| Means of curing | UV-rays | UV-rays | UV-rays | electron beam | electron beam | electron beam |
| Exposure dose (mJ/cm$^2$) | 200 | 200 | 400 | — | — | — |
| Exposure dose (Mrad) | — | — | — | 2 | 2 | 4 |

Note:
*in terms of hours

TABLE 9

| | Comparative example No. | | | | | |
|---|---|---|---|---|---|---|
| | 11 | | | 12 | | |
| Change in melt viscosity (cps) | | | | | | |
| Temperature (°C.) | | 80 | 80 | | | 80 |
| Initial viscosity | | 29,000 | | | 25,000 | |
| Viscosity after 24 hours | | 34,000 | | | 32,000 | |
| Coating amount (μm) | 25 | 40 | 80 | 25 | 40 | 80 |
| 180° Peel strength (kg/inch) | 1.1 | 1.2 | 1.4 | 1.0 | 1.1 | 1.3 |
| Ball tack | 6 | 8 | 9 | 5 | 7 | 8 |
| Retention force at 40° C.* | 0.3 | 0.5 | 0.4 | 0.3 | 0.3 | 0.5 |
| Means of curing | electron beam | electron beam | electron beam | electron beam | electron beam | electron beam |
| Exposure dose (Mrad) | 2 | 2 | 4 | 2 | 2 | 4 |

Note:
*in terms of hours

REFERENCE EXAMPLE 24)

Into 100 parts of xylene, as a solvent, 80 parts of styrene, 20 parts of glycidyl methacrylate, as a monomer (c), and 10 parts of t-butylperoxy-2-ethylhexanoate, as a polymerization initiator were added, and polymerization was conducted at a reaction temperature of 140° C. for 5 hours, to obtain a low-molecular-weight polymer base (BIV-1) solution. The number-average molecular weight of this low-molecular-weight polymer base (BIV-1) was about 3,000, and its Tg was about 43° C.

To 100 parts of this low-molecular-weight polymer base, 0.5 parts of acrylic acid, as a monomer (f), and 0.5 parts of t-butylperoxy-2-ethylhexanoate, as a polymerization initiator, were added, and reaction was conducted at 100° C. for 4 hours, to obtain a mixed solution of reactive polymer/low-molecular-weight polymer base (HA-1).

REFERENCE EXAMPLE 25)

Into 50 parts of toluene, as a solvent, 70 parts of n-butyl acrylate, 0.4 parts of glycidyl acrylate, as a monomer (c), 30 parts in terms of solid of the mixed solution of reactive polymer/low-molecular-weight polymer base (HA-1) obtained in above Reference Example 24, and 0.2 parts of t-butylperoxy-2-ethylhexanoate, as a polymerization initiator, were added, and polymerization was carried out at the reaction temperature of 100° C. for 5 hours, to obtain a mixed solution (ab-1) of high-molecular-weight polymer base (AIV-1)/low-molecular-weight polymer base (BIV-1).

In the mixed solution (ab-1), the main chain part of the high-molecular weight polymer base had a number average molecular weight of about 20,000 and Tg of about −45° C.

To 100 parts of this mixed solution of high-molecular-weight polymer base/low-molecular-weight polymer base (ab-1), 1.5 parts of acrylic acid and 0.3 parts of t-buryl ammonium bromide, as a catalyst, were added, and reaction was carried out at 100° C. for 4 hours, to obtain a mixed solution of high-molecular-weight polymer/low-molecular-weight polymer (AB-7).

EXAMPLE 24

To 100 parts of the mixed solution of high-molecular-weight polymer/low-molecular-weight polymer (AB-1) 0.1 parts of tris(nonylphenyl)phosphite as a phosphite antioxidant was added, and the desired product was obtained by removing solvent. The results of evaluation are shown in Table 10.

TABLE 10

| | Example 24 |
|---|---|
| Change in melt viscosity (cps) | |

TABLE 10-continued

| | Example 24 | | |
|---|---|---|---|
| Temperature (°C.) | | 80 | |
| Initial viscosity | | 22,000 | |
| Viscosity after 24 hours | | 25,000 | |
| Coating amount (μm) | 25 | 40 | 80 |
| 180° Peel strength (kg/inch) | 0.9 | 1.0 | 1.2 |
| Ball tack | 7 | 8 | 9 |
| Retention force at 80° C.* | 24 < | 24 < | 24 < |
| Means of curing | electron beam | electron beam | electron beam |
| Exposure dose (Mrad) | 2 | 2 | 4 |

Note:
*in terms of hours

TABLE 11

| | Example 25 | | |
|---|---|---|---|
| Change in melt viscosity (cps) | | | |
| Temperature (°C.) | | 80 | |
| Initial viscosity | | 15,000 | |
| Viscosity after 24 hours | | 20,000 | |
| Coating amount (μm) | 25 | 40 | 80 |
| 180° Peel strength (kg/inch) | 0.7 | 0.8 | 1.1 |
| Ball tack | 8 | 8 | 10 |
| Retention force at 80° C.* | 24 < | 24 < | 24 < |
| Means of curing | UV-rays | UV-rays | UV-rays |
| Exposure dose (mJ/cm²) | 200 | 200 | 200 |

Note:
*in terms of hours (REFERENCE EXAMPLE 26)

Into 100 parts of xylene, as a solvent, 40 parts of methyl methacrylate, 40 parts of 2-ethylhexyl acrylate, parts of glycidyl methacrylate, as a monomer (c), and 5 parts of t-butylperoxy-2-ethylhexanoate, as a polymerization initiator were added, and polymerization was conducted at a reaction temperature of 140° C. for 5 hours, to obtain a low-molecular-weight polymer base (BIV-2) solution. The number-average molecular weight of this low-molecular-weight polymer base (BIV-2) was about 5,000, and its Tg was about 3° C.

To 100 parts of this low-molecular-weight polymer base, 0.5 parts of acrylic acid, as a monomer (f), and 0.5 parts of t-butylammonium bromide, as a polymerization initiator, were added, and reaction was conducted at 100° C. for 4 hours, to obtain a mixed solution of reactive polymer/low-molecular-weight polymer base (HA-2).

REFERENCE EXAMPLE 27)

Into 50 parts of toldene, as a solvent, 40 parts of n-butyl acrylate, 20 parts of 2-ethylhexyl acrylate, 0.8 parts of glycidyl acrylate, as a monomer (c), 30 parts in terms of solid of the mixed solution of reactive polymer/low-molecular-weight polymer base (HA-2) obtained in above Reference Example 26, and 0.2 parts of t-butylperoxy-2-ethylhexanoate, as a polymerization initiator, were added, and polymerization was carried out at the reaction temperature of 100° C. for 5 hours, to obtain a mixed solution (ab-2) of high-molecular-weight polymer base/low-molecular-weight polymer base.

In the mixed solution (ab-2), the main chain part of the high-molecular-weight polymer base had a number average molecular weight of about 15,000 and Tg of about −52° C.

To 100 parts of this mixed solution of high-molecular-weight polymer base/low-molecular-weight polymer base (ab-2), 3.0 parts of acrylic acid and 0.3 parts of t-butyl ammonium bromide, as a catalyst, were added, and reaction was carried out at 100° C. for 4 hours, to obtain a mixed solution of high-molecular-weight polymer/low-molecular-weight polymer (AB-8).

EXAMPLE 25

To° 100 parts of the mixed solution of high-molecular-weight polymer/low-molecular-weight polymer (AB-8) 0.1 parts of tris(nonylphenyl)phosphite, as a phosphite antioxidant, and 3 parts of benzoinisopropyl ether, as a photopolymerization initiator, were added, and the desired product was obtained by removing solvent. The results of evaluation are shown in Table 11.

REFERENCE EXAMPLE 28)

Into 100 parts of xylene, as a solvent, 95 parts of methyl methacrylate and 5 parts of thioglycolic acid, as a monomero(c), were added, and the mixture was heated at a temperature of 80° C., under an atmosphere of nitrogen. Ten parts of 4,4'-azobis-4-cyanovaleric acid dissolved in 30 arts of xylene was added dropwise over 3 hours, followed by heating for further 1 hour, to obtain a low-molecular-weight polymer base (BIV-3) solution. The number-average molecular weight of this low-molecular-weight polymer base (BIV-3) was about 3,000, and its Tg was about 16° C.

To 100 parts of this low-molecular-weight polymer base, 1.0 part of glycidyl methacrylate, as a monomer (f), and 0.5 parts per 100 parts of polymer of t-butylammonium bromide, as a polymerization initiator, were added, and reaction was conducted at 100° C. for 4 hours, to obtain a mixed solution of reactive polymer/low-molecular-weight polymer base (HA-3).

REFERENCE EXAMPLE 29)

Into 50 parts of toluene, as a solvent, 40 parts of n-butyl acrylate, 40 parts of 2-ethylhexyl acrylate, 0.2 parts of acrylic acid, as a monomer (c), and 20 parts in terms of polymer of the mixed solution of reactive polymer/low-molecular-weight polymer base (HA-3) obtained in above Reference Example 28 were added, and then 0.2 parts of 4,4'-azobis-cyanovaleric acid, as a polymerization initiator, was added dropwise over 3 hours, followed by heating for further 1 hour, to obtain a mixed solution (ab-3) of high-molecular-weight polymer base/low-molecular-weight polymer base.

In the mixed solution (ab-3), the main chain part of the high-molecular weight polymer base had a number average molecular weight of about 23,000 and Tg of about −49° C.

To 100 parts of this mixed solution of high-molecular-weight polymer base/low-molecular-weight polymer base (ab-3), 3.0 parts of glycidyl mathacrylate and 0.35 parts of t-butyl ammonium bromide, as a catalyst, were added, and reaction was carried out at 100° C. for 4 hours, to obtain a mixed solution of high-molecular-weight polymer/low-molecular-weight polymer (AB-9).

EXAMPLE 26

To 100 parts of the mixed solution of high-molecular-weight polymer/low-molecular-weight polymer (AB-9), obtained in Reference Example 29, 0.1 parts of tris(nonylphenyl)phosphite, as a phosphite antioxidant, and 3 parts of benzoinisopropyl ether, as a photopolymerization initiator, were added, and the desired product was obtained by removing solvent. The results of evaluation are shown in Table 12.

TABLE 12

|  | Example 25 | | |
|---|---|---|---|
| Change in melt viscosity (cps) | | | |
| Temperature (°C.) | 80 | | |
| Initial viscosity | 21,000 | | |
| Viscosity after 24 hours | 26,000 | | |
| Coating amount (μm) | 25 | 40 | 80 |
| 180° Peel strength (kg/inch) | 0.8 | 0.9 | 1.0 |
| Ball tack | 7 | 8 | 10 |
| Retention force at 80° C.* | 24 < | 24 < | 24 < |
| Means of curing | UV-rays | UV-rays | UV-rays |
| Exposure dose (mJ/cm²) | 200 | 200 | 200 |

Note:
*in terms of hours

The number of ethylenically unsaturated groups contained in each high-molecular-weight polymer used in the Examples is summarized in the following Table 13.

TABLE 13

| High-molecular weight polymer | Number of ethylenically unsaturated groups per 1,000 of molecular weight |
|---|---|
| Example 1: AI$_2$ | 0.009 |
| 2: AI$_1$ | 0.10 |
| 3: AI$_1$ | 0.14 |
| 4: AI$_2$ | 0.009 |
| 5: AI$_1$ | 0.14 |
| 6: AI$_1$ + AI$_2$ | 0.10 |
| 7: AI$_2$ | 0.009 |
| 8: AI$_1$ | 0.14 |
| Comparative | |
| example 1 | 0 |
| 2 | 0 |
| 3 | 3 |
| 4 | 3 |
| Reference | |
| example 3 (AII-1) | 0.034 |
| 4 (AII-2) | 0.035 |
| 5 (AII-3) | 0.051 |
| 18 (AB-1) | 0.42 |
| 19 (AB-2) | 0.32 |
| 20 (AB-3) | 0.41 |
| 21 (AB-4) | 0.008 |
| 22 (AB-5) | 0 |
| 23 (AB-6) | 0.41 |
| 25 (AB-7) | 0.054 |
| 27 (AB-8) | 0.150 |
| 29 (AB-9) | 0.058 |

As is apparent from the above results of the evaluation, since the reactive hot-melt pressure-sensitive adhesive composition of the present invention is excellent both in workability in hot-melt coating and in heat-resistant cohesive force of the pressure-sensitive adhesive unlike the conventional acrylic hot-melt pressure-sensitive adhesive, the reactive hot-melt pressure-sensitive adhesive composition of the present invention can be used effectively in the field of pressure-sensitive adhesive tapes, sheets, and labels.

Having described our invention as related to the present embodiments, it is our intention that the invention not be limited by any of the details of the description, unless otherwise specified, but rather be construed broadly within its spirit and scope as set out in the accompanying claims.

What we claim is:

1. An actinic-radiation-curing, hot-melt, pressure-sensitive adhesive composition, which comprises 90 to 50 parts by weight of a high-molecular-weight polymer (A), wherein, to a main chain that is made up of, as a main component, an alkyl (meth)acrylate whose alkyl group has 1 to 12 carbon atoms and has a number-average molecular weight of 8,000 to 100,000 and has a glass transition temperature of −75° to −20° C., at least one polymer component that is made by copolymerization of at least one monomer having an ethylenically unsaturated group in the molecule and has a number-average molecular weight of 500 to 30,000 and a glass transition temperature of −80° to 100° C. is bonded as a branched chain, and the branched chain and/or the main chain has at least one ethylenically unsaturated group; and 10 to 50 parts by weight of a low-molecular-weight polymer (B) that is made by polymerization of at least one monomer having at least one ethylenically unsaturated group, having or not having an ethylenically unsaturated group in the polymer and has a number-average molecular weight of 500 to 8,000 and a glass transition temperature of −80° to 100° C.

2. The actinic-radiation-curing, hot-melt, pressure-sensitive adhesive composition as claimed in claim 1, wherein the branched chain of the high-molecular-weight polymer (A) and/or the low-molecular-weight polymer (B) is a mixture of two or more polymers.

3. An adhesive product, which comprises a substrate coated with the actinic-radiation-curing, hot-melt, pressure-sensitive adhesive composition as claimed in claim 1.

4. The actinic-radiation-curing, hot-melt, pressure-sensitive adhesive composition as claimed in claim 1, wherein the main chain of the high-molecular-weight copolymer (A) is formed by copolymerization in the presence of a thermoplastic resin.

5. The actinic-radiation-curing, hot-melt, pressure-sensitive adhesive composition as claimed in claim 1, wherein the ethylenically unsaturated group in the main chain of high-molecular-weight copolymer (A) exists at the end of the molecule and/or at the inner part of the molecule.

6. The actinic-radiation-curing, hot-melt, pressure-sensitive adhesive composition as claimed in claim 1, wherein the ethylenically unsaturated group in the branched chain of the high-molecular-weight copolymer (A) exists at the end of the molecule and/or at the inner part of the molecule.

7. The actinic-radiation-curing, hot-melt, pressure-sensitive adhesive composition as claimed in claim 1, wherein the ethylenically unsaturated group in the low-molecular-weight polymer (B) exists at the end of the molecule and/or at the inner part of the molecule.

8. An actinic-radiation-curing, hot-melt, pressure-sensitive adhesive composition, which comprises 50 to 90 parts by weight of a mixture of one or more high-molecular-weight polymers selected from the group of the below-mentioned high-molecular-weight polymers (AI), which polymer has at least one ethylenically unsaturated group in the molecule and a number-average molecular weight of 10,000 to 100,000, and 50 to 10 parts by weight of the below mentioned low-molecular-weight polymer (BI), which polymer has or does not have at least one ethylenically unsaturated group and with a number-average molecular weight of 500 to 8,000, (AI) High-molecular-weight copolymers having at least one ethylenically unsaturated group:
1) High-molecular-weight copolymer (AI$_1$) having at least one ethylenically unsaturated group in the molecule that is prepared by copolymerizing a monomer (c) having an ethylenically unsaturated group and a reaction-active group in the molecule, a macromonomer (da) having an ethylenically unsaturated group at the end of the molecule, a number-average molecular weight of 2,000 or more, and a glass transition temperature of 20° C. or higher, and en alkyl (meth)acrylate (e) whose alkyl group has 1 to 12 carbon atoms, followed by reaction with a monomer (f) having an ethylenically unsaturated group and a group capable of reacting with the above reaction-active group, wherein the glass transition temperature of the alkyl (meth)acrylate moiety of the copolymer is −75° to −20° C., 2) High-molecular-weight polymer (AI$_2$) having at least one ethylenically unsaturated group that are prepared by copolymerizing a monomer (c) having an ethylenically unsaturated group and a reaction-active group in the, molecule, with an alkyl (meth)acrylate (e) whose alkyl group has 1 to 12 carbon atoms, in the presence of a thermoplastic resin (g), followed by reaction with a monomer (f) having an ethylenically unsaturated group and a group capable of reacting with the above reaction-active group, wherein the glass transition temperature of the alkyl (meth)acrylate moiety of the copolymer is −75° to −20° C., (BI) Low-molecular-weight polymers:

1) Low-molecular-weight polymer (BI$_1$) having a glass transition temperature of −30° to 80° C. and at least one ethylenically unsaturated group in the molecule that is prepared by copolymerizing at least one monomer selected from the group of vinyl acetate and alkyl (meth)acrylates (e) whose alkyl group has 1 to 12 carbon atoms, with a monomer (c) having an ethylenically unsaturated group and an reaction-active group in the molecule, followed by reaction with a monomer (f) having an ethylenically unsaturated group and a group capable of reacting with the above reaction-active group, 2) Low-molecular-weight polymer (BI$_2$) having a glass transition temperature of −30° to 80° C. and not having ethylenically unsaturated group that is prepared by copolymerizing at least one monomer selected from the group of vinyl acetate and alkyl (meth)acrylates (e) whose alkyl group has 1 to 12 carbon atoms.

9. The actinic-radiation-curing, hot-melt, pressure-sensitive adhesive composition as claimed in claim 8, wherein the high-molecular-weight polymer (AI$_1$) is prepared by copolymerizing 0.05 to 10 wt % of the monomer (c) having an ethylenically unsaturated group and a reaction-active group in the molecule, 2 to 30 wt % of the macromonomer (da), and 97.9 to 50 wt % of the alkyl (meth)acrylate (e) whose alkyl group has 1 to 12 carbon atoms, followed by reaction with 0.05 to 10 wt % of the monomer (f) having an ethylenically unsaturated group and a group capable of reacting with the above reaction-active group.

10. The actinic-radiation-curing, hot-melt, pressure-sensitive adhesive composition as claimed in claim 8, wherein the high-molecular-weight polymer (AI$_2$) is prepared by copolymerizing 0.05 to 10 wt % of the monomer (c) having an ethylenically unsaturated group and a reaction-active group in the molecule, with 97.9 to 50 wt % of the alkyl (meth)acrylate (e) whose alkyl group has 1 to 12 carbon atoms, in the presence of 2 to 30 wt % of the thermoplastic resin (g), followed by reaction with 0.05 to 10 wt % of the monomer (f) having an ethylenically unsaturated group and a group capable of reacting with the above reaction-active group.

11. The actinic-radiation-curing, hot-melt, pressure-sensitive adhesive composition as claimed in claim 8, wherein the low-molecular-weight polymer (BI$_1$) is prepared by copolymerizing 0.1 to 50 wt % of the monomer (c) having an ethylenically unsaturated group and a reaction-active group in the molecule, with 99.8 to 30 wt % of at least one monomer selected from the group of vinyl acetate and the alkyl (meth)acrylate (e) whose alkyl group has 1 to 12 carbon atoms, followed by reaction with 0.1 to 50 wt % of the monomer (f) having an ethylenically unsaturated group and a group capable of reacting with the above reaction-active group.

12. An actinic-radiation-curing, hot-melt, pressure-sensitive adhesive composition, which comprises 10 to 90 parts by weight of the below-mentioned high-molecular-weight polymer (AII), which polymer has at least one ethylenically unsaturated group in the molecule and a number-average molecular weight of 10,000 to 100,000, and 90 to 10 parts by weight of the below-mentioned low-molecular-weight polymer (BII), which polymer has or does not have at least one ethylenically unsaturated group and has a number-average molecular weight of 500 to 8,000, High-molecular-weight copolymer (AII):

High-molecular-weight copolymer having at least one ethylenically unsaturated group in the molecule that is prepared by copolymerizing a monomer (c) having an ethylenically unsaturated group and a reaction-active group in the molecule, a reactive polymer (d) having an ethylenically unsaturated group in the molecule, a number-average molecular weight of 2,000 or more, and a glass transition temperature of 20° C. or higher, and an alkyl (meth)acrylate (e) whose alkyl group has 1 to 12 carbon atoms, followed by reaction with a monomer (f) having an ethylenically unsaturated group and a group capable of reacting with the above reaction-active group in the molecule, wherein the glass transition temperature of the alkyl (meth)acrylate moiety of the copolymer is −75° to −20° C., Low-molecular-weight polymers ( BII ): one of the following low-molecular-weight copolymer (BII$_1$), (BII$_2$), or (BII$_3$), or a mixture thereof, 1) Low-molecular-weight polymer (BII$_1$) having a glass transition temperature of −60° to 80° C. and at least one ethylenically unsaturated group that is prepared by copolymerizing at least one monomer selected from the group of vinyl acetate and alkyl (meth)acrylates (e) whose alkyl group has 1 to 12 carbon atoms, with a monomer (c) having an ethylenically unsaturated group and a reaction-active group in the molecule, followed by reaction with a monomer (f) having an ethylenically unsaturated group and a group capable of reacting with the above reaction-active group in the molecule, 2) Low-molecular-weight polymer (BII$_2$) having a glass transition temperature of −60° to 80° C. and not having ethylenically unsaturated groups that is prepared by copolymerizing at least one monomer selected from the group of vinyl acetate and alkyl (meth)acrylates (e) whose alkyl group has 1 to 12 carbon atoms, 3) Low-molecular-weight polymer (BII$_3$) having a glass transition temperature of −60° to 80° C. and at least one ethylenically unsaturated group at the end of molecule that has main component prepared by copolymerizing at least one monomer selected from the group of vinyl acetate and alkyl (meth)acrylates (e) whose alkyl group has 1 to 12 carbon atoms.

13. The actinic-radiation-curing, hot-melt, pressure-sensitive adhesive composition as claimed in claim 12, wherein the high-molecular-weight polymer (AII) is prepared by copolymerizing 0.05 to 10 wt % of the monomer (c) having an ethylenically unsaturated group and a reaction-active group in the molecule, 2 to 30 wt % of the reactive° polymer (d) having an ethylenically unsaturated group in the molecule and has a number-average molecular weight of 2,000 or more and a glass transition temperature of 20° C. or higher, and 97.9 to 50 wt % of the alkyl (meth)acrylate whose alkyl group has 1 to 12 carbon atoms, followed by reaction with 0.05 to 10 wt % of the monomer (f) having an ethylenically unsaturated group and a group capable of reacting with the above reaction-active group.

14. The actinic-radiation-curing, hot-melt, pressure-sensitive adhesive composition as claimed in claim 12, wherein the low-molecular-weight polymer (BII$_1$) is prepared by copolymerizing 0.1 to 50 wt % of the monomer (c) having ah ethylenically unsaturated group and a reaction-active group in the molecule, with 99.8 to 30 wt % of at least one monomer selected from the group of vinyl acetate and the alkyl (meth)acrylate (e) whose alkyl group has 1 to 12 carbon atoms, followed by reaction with 0.1 to 50 wt % of the monomer (f) having an ethylenically unsaturated group and a group capable of reacting the above reaction-active group in the molecule.

15. An actinic-radiation-curing, hot-melt, pressure-sensitive adhesive composition, which comprises 5 to 200 parts, by weight of a low-molecular-weight polymer (BIII), which polymer has two or more ethylenically unsaturated groups in the molecule, a glass transition temperature of lower than 100° C., and a number-average molecular weight of 1,500 to 6,000; and 100 parts by weight of a high-molecular-weight polymer (AIII), whose main chain is mainly made up of an alkyl (meth)acrylate whose alkyl group has 1 to 12 carbon atoms, and has a number-average molecular weight of 8,000 to 100,000 and a glass transition temperature of −75° to −20° C.; and to this main chain, a low-molecular-weight polymer component, having a glass transition temperature of lower than 100° C. and a number-average molecular weight of 1,500 to 6,000, is bonded as a branched chain, and the branched chain has at least one ethylenically unsaturated group.

16. The actinic-radiation-curing, hot-melt, pressure-sensitive adhesive composition as claimed in claim 15, wherein each of the low-molecular-weight polymer (BIII) and the low-molecular-weight polymer component bonded as a branched chain in the high-molecular-weight polymer is a mixture of two or more polymers.

17. An adhesive article, comprising a substrate coated with the actinic-radiation-curing, hot-melt, pressure-sensitive adhesive composition as claimed in claim 15.

18. An actinic-radiation-curing, hot-melt, pressure-sensitive adhesive composition, which comprises 90 to 50 parts by weight of a high-molecular-weight polymer (AIV), wherein, to a main chain that is made up of, as a main component, an alkyl (meth)acrylate whose alkyl group has 1 to 12 carbon atoms and has a number-average molecular weight of 8,000 to 100,000 and has a glass transition temperature of −75° to −20° C., a low-molecular-weight polymer component that is made by copolymerization of at least one monomer having an ethylenically unsaturated group in the molecule and has a number-average molecular weight of 500 to 30,000 and a glass transition temperature of −80° to 100° C. is bonded as a branched chain, and the branched chain and the main chain has at least one ethylenically unsaturated group; and 10 to 50 parts by weight of the below-mentioned low-molecular-weight polymer (BIV), which polymer has at least one ethylenically unsaturated group or does not have ethylenically unsaturated group in the molecule and has a number-average molecular weight of 500 to 8,000, High-molecular-weight copolymer (AIV): High-molecular-weight copolymer having ethylenically unsaturated groups in the molecule that is prepared by copolymerizing a monomer (c) having an ethylenically unsaturated group and a reaction-active group in the molecule, a reactive polymer (d) having at least one ethylenically unsaturated group and at least one reaction-active group in the molecule, a number-average molecular weight of 500 to 30,000, and a glass transition temperature of −80° to 100° C., and an alkyl (meth)acrylate (e) whose alkyl group has 1 to 12 carbon atoms, followed by reaction with a monomer (f) having an ethylenically unsaturated group and a group capable of reacting with the above reaction-active group in the molecule, wherein the glass transition temperature of the alkyl (meth)acrylate moiety of the copolymer is −75° to −20° C., Low-molecular-weight polymers (BIV): one of the following low-molecular-weight copolymer (BIV$_1$), (BIV$_2$), or (BIV$_3$), or a mixture thereof, 1) Low-molecular-weight polymer (BIV$_1$) having a glass transition temperature of −80° to 100° C. and at least one ethylenically unsaturated group that is prepared by copolymerizing at least one monomer having an ethylenically unsaturated group in the molecule, with a monomer (c) having an ethylenically unsaturated group and a reaction-active group in the molecule, followed by reaction with a monomer (f) having an ethylenically unsaturated group and a group capable of reacting with the above reaction-active group in the molecule, 2) Low-molecular-weight polymer (BIV$_2$) having a glass 2) Low-molecular-weight polymer (BIV$_2$) having a glass

* * * * *